US009497249B2

(12) United States Patent
Gotoh et al.

(10) Patent No.: US 9,497,249 B2
(45) Date of Patent: Nov. 15, 2016

(54) INFORMATION PROCESSING APPARATUS, INFORMATION PROCESSING METHOD, PROGRAM, AND INFORMATION PROCESSING SYSTEM

(75) Inventors: Tomohiko Gotoh, Kanagawa (JP); Daisuke Mochizuki, Chiba (JP); Shunsuke Mochizuki, Tokyo (JP); Yuki Okamura, Saitama (JP); Yun Sun, Tokyo (JP); Tatsuhito Sato, Tokyo (JP); Takeshi Yaeda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 358 days.

(21) Appl. No.: 13/551,075

(22) Filed: Jul. 17, 2012

(65) Prior Publication Data
US 2013/0041889 A1 Feb. 14, 2013

(30) Foreign Application Priority Data

Aug. 8, 2011 (JP) .................................. 2011-172748
Aug. 8, 2011 (JP) .................................. 2011-172749

(51) Int. Cl.
*G06F 7/00* (2006.01)
*G06F 17/30* (2006.01)
*H04L 29/08* (2006.01)

(52) U.S. Cl.
CPC ........... *H04L 67/02* (2013.01); *G06F 17/3089* (2013.01)

(58) Field of Classification Search
CPC ............................ G06F 17/3089; H04L 67/02
See application file for complete search history.

(56) References Cited

U.S. PATENT DOCUMENTS

| 5,893,095 | A  | * | 4/1999  | Jain et al. |
| 6,804,684 | B2 | * | 10/2004 | Stubler et al. |
| 7,289,812 | B1 | * | 10/2007 | Roberts et al. ............ 455/456.1 |
| 7,519,618 | B2 | * | 4/2009  | Nagahashi et al. |
| 7,693,870 | B2 | * | 4/2010  | Gotoh et al. ........... 707/999.107 |
| 7,697,731 | B2 | * | 4/2010  | Takematsu et al. .......... 382/115 |
| 7,793,211 | B2 | * | 9/2010  | Brenner ........................ 715/230 |
| 7,831,599 | B2 | * | 11/2010 | Das et al. ..................... 707/737 |
| 8,520,979 | B2 | * | 8/2013  | Conwell ....................... 382/305 |
| 8,538,961 | B2 | * | 9/2013  | Xu et al. ...................... 707/736 |
| 8,606,021 | B2 | * | 12/2013 | Conwell ....................... 382/224 |
| 8,682,084 | B2 | * | 3/2014  | Gotoh et al. .................. 382/224 |
| 2005/0078174 | A1 | * | 4/2005 | Casey et al. ................... 348/61 |
| 2006/0195475 | A1 | * | 8/2006 | Logan et al. ............... 707/104.1 |
| 2008/0292196 | A1 | * | 11/2008 | Jain .................. G06F 17/30265 382/225 |
| 2009/0192998 | A1 | * | 7/2009 | Paulsen ............................ 707/3 |
| 2010/0299385 | A1 | * | 11/2010 | Root et al. .................... 709/202 |
| 2013/0041889 | A1 | * | 2/2013 | Gotoh et al. .................. 707/722 |

FOREIGN PATENT DOCUMENTS

JP 2011-060210 3/2011

* cited by examiner

*Primary Examiner* — Taelor Kim
(74) *Attorney, Agent, or Firm* — Chip Law Group

(57) ABSTRACT

An information processing apparatus that includes circuitry configured to search for related content from compared content, the related content being content related to reference content possessed by a user, the compared content being content other than the reference content, set, in response to a selection to perform meta tag assignment processing, meta tag information, which is a name of the reference content, according to the related content, and determine, in response to a selection to perform sharing processing, whether the related content is shareable between the user who is associated with the related content and another user, based on whether a relationship exists between the user and the another user.

18 Claims, 15 Drawing Sheets

INFORMATION PROCESSING APPARATUS, INFORMATION PROCESSING METHOD, PROGRAM, AND INFORMATION PROCESSING SYSTEM

BACKGROUND

The present disclosure relates to an information processing apparatus, an information processing method, a program, and an information processing system.

An increasing number of services are provided in which a user uploads content to a server and browses it with a Web browser or the like, as described in, for example, Japanese Unexamined Patent Application Publication No. 2011-060210.

In these services, a plurality of users not only manage their own content but also can open their content among them or can share part of their content.

In servers in related art, however, to assign a name, that is, meta tag information, to user's own content, the user has set the meta tag information by himself or herself. In view of this situation, a technology that automatically assigns meta tag information to content has been desired.

The present disclosure provides an information processing apparatus that includes a content search unit that searches for related content, which is related to reference content, which is content possessed by the user, from compared content, which is content other than the reference content, and also includes a meta tag assignment unit that sets meta tag information, which is a name of the reference content, according to the related content.

The present disclosure also provides an information processing method that includes a search for related content, which is related to reference content, which is content possessed by the user, from compared content, which is content other than the reference content, and also the setting of meta tag information, which is a name of the reference content, according to the related content.

The present disclosure also provides a program that implements a content search function that searches for related content, which is related to reference content, which is content possessed by the user, from compared content, which is content other than the reference content, and also includes a meta tag assignment function that sets meta tag information, which is a name of the reference content, according to the related content.

The present disclosure also provides an information processing apparatus that includes a server and a user terminal; the server has a content searching unit that searches for related content, which is related to reference content, which is content possessed by the user, from compared content, which is content other than the reference content, and also includes a meta tag assignment unit that sets meta tag information, which is a name of the reference content, according to the related content; the user terminal asks the server to assign meta tag information to the reference content.

Therefore, the present disclosure can set meta tag information in the reference content according to related content.

As described above, the present disclosure can automatically assign meta tag information to content.

DETAILED DESCRIPTION OF EMBODIMENTS

Figure 1:
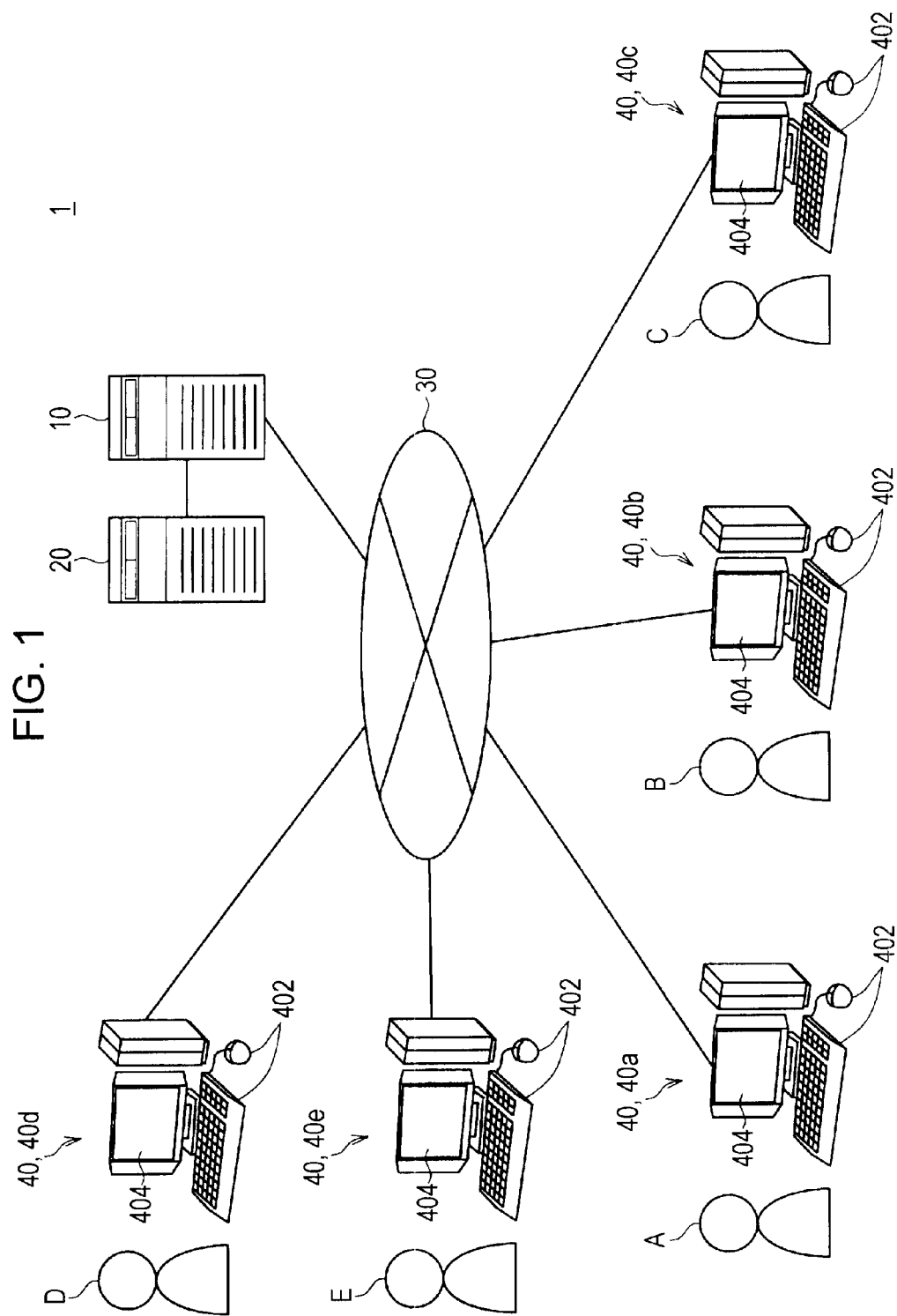
FIG. 1 illustrates an information processing system in an embodiment of the present disclosure.

A preferred embodiment of the present disclosure will be described below with reference to the attached drawings. In the description below and the drawings, constituent elements having substantially the same function or structure are indicated by the same reference numeral to eliminate duplicate descriptions.

Descriptions will be given in the following order.
1. Structure of information processing system
1-1. Entire structure
1-2. Structure of server
1-3. Structure of user terminal
2. Procedures of processing executed by information processing system
2-1. Procedure for analyzing content
2-2. Procedure for creating cluster
2-3. Procedure for providing service
1. Structure of Information Processing System
1-1. Entire Structure The entire structure of an information processing system 1 will be described first with reference to FIG. 1. The information processing system 1 includes a server 10, a storage server 20, a network 30, and a plurality of user terminals 40 (40a to 40e). The user terminals 40a to 40e are respectively used by different users A to E. Although one server 10, one storage server 20, and five user terminals 40 are illustrated in FIG. 1, the numbers of these constituent elements are not limited to the quantities in FIG. 1.

The network 30 interconnects the server 10 and user terminals 40. The storage server 20 is connected to the server 10. The server 10 can communicate with the user terminals 40 through the network 30. The server 10 can also communicate with other communication units (not shown), such as a television receiver, a car navigation system, a mobile telephone, a digital camera, a game machine, a music player, a smart phone, and a smart tablet, through the network 30.

The storage server 20 stores content (in effect, content information indicating content) uploaded by users. That is, each user can upload content created by the user from the user's own terminal 40 or another communication unit described above to the storage server 20. Any content can be updated to the storage server 20; for example, content may include image content, such as photograph content and moving picture content, voice content, and text content, such as blogs, short blogs (such as tweets) and memos.

Meta information has been related (assigned) to content stored in the storage server 20. Meta information may be, for example, user information, time information, positional information, environmental information, event information, communication information, sharing information, and analysis meta information.

The user information refers to a user who has created the content. The time information refers to a time (year, month, day, for example) at which the content was created. The positional information refers to a position (place name, address, altitude, or direction, for example) at which the content was created. If the content is photograph content, the time information and positional information are assigned to the content as the so-called exchangeable image file format (EXIF) information. If, for example, photograph content is created with a mobile telephone having a photograph function or a digital camera, the mobile telephone or digital camera assigns EXIF information to the photograph content.

The environmental information refers to an environment (weather and a camera parameter (zoom ratio), for example) at a time and position at which the content was created. The event information refers to an event (ski tour or barbecue, for example) carried out at a time and position at which the content was created. The communication information is assigned to content when the device used to create the content is a mobile communication device (mobile telephone having a photograph function or digital camera, for example) and the mobile communication device has performed near field communication with another mobile communication device. The communication information refers to an ID that identifies a mobile communication device of a distant party, date and time of communication, and the like. The sharing information refers to a user with which content is to be shared.

The above user information, time information, positional information, environmental information, and event information are assigned to the relevant content by the user. Specifically, the user assigns meta information to the content manually (that is, by using the user terminal 40 or another device that the user used to create the content). These information items may be automatically assigned to the content by the device used to create the content. The communication information is automatically assigned to the content by the device used to create the content, that is, the mobile communication device. The sharing information is assigned to the content by the server 10.

The analysis meta information is meta information obtained when the server 10 analyzes content. The analysis meta information may be, for example, person information (such as the name of a person) obtained when face recognition processing is performed for image content. Another example may be subject information (such as the name of a subject) obtained when scene recognition processing is performed for image content. The analysis meta information is assigned to content as meta information.

Alternatively, the analysis meta information may be word information obtained when morphological analysis is performed for text content or person information obtained when voice recognition processing is performed for voice content. There is no limitation to forms of the meta information; any forms such as text, images (including moving pictures), voice, and the like may be used.

1-2. Structure of Server

Figure 2:
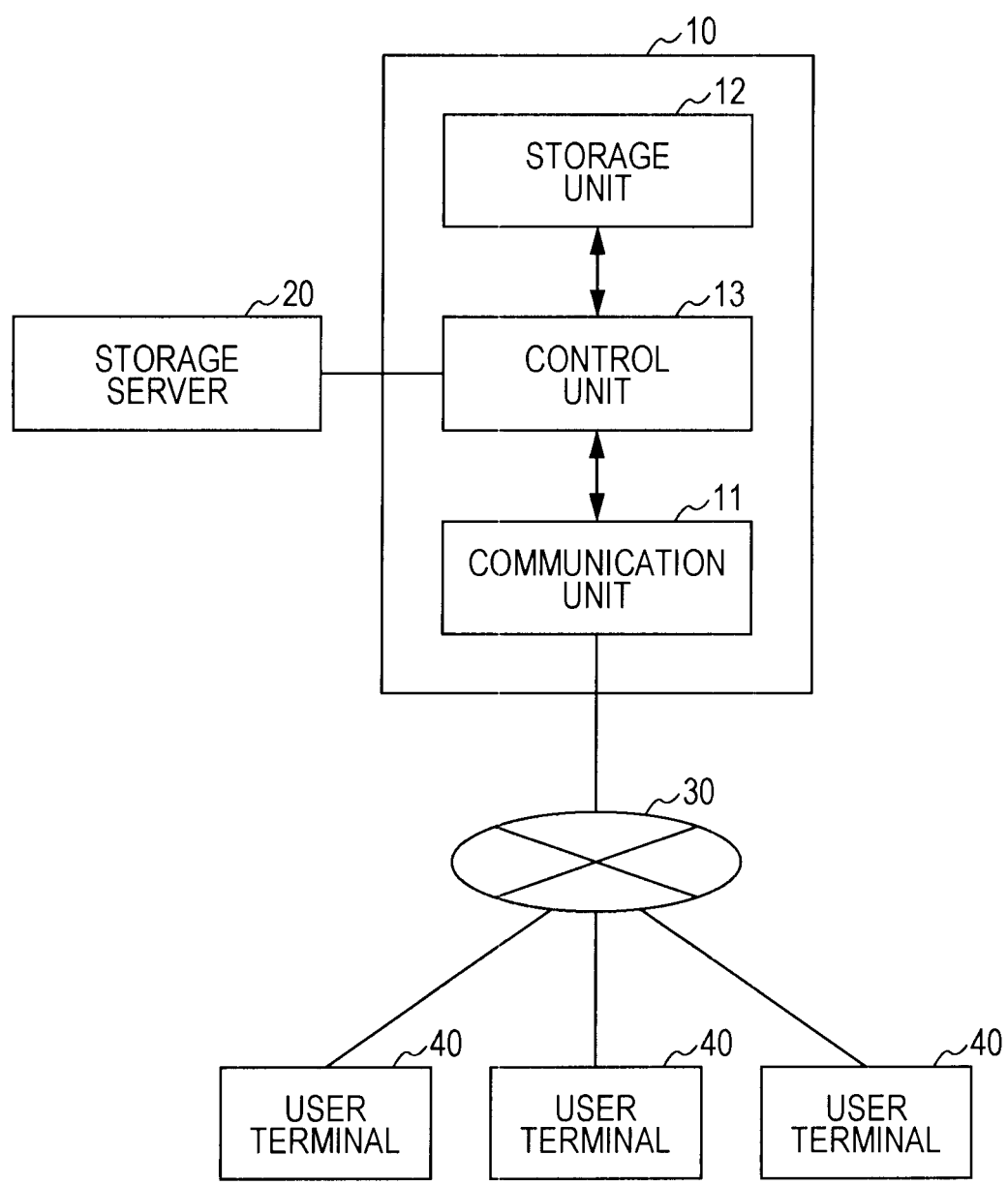
FIG. 2 is a block diagram illustrating a server in the embodiment.
Figure 3:
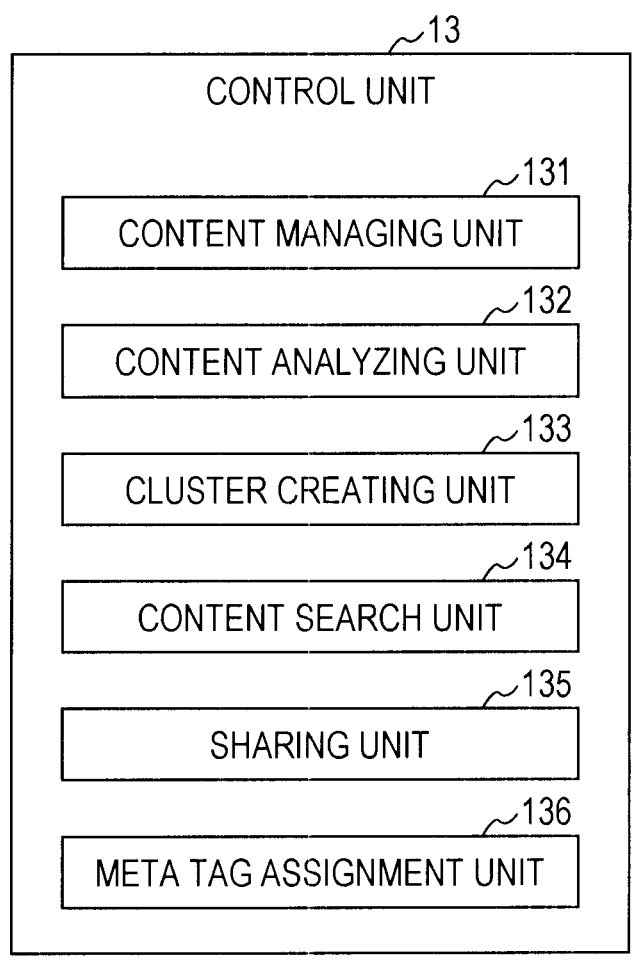
FIG. 3 is a block diagram illustrating the structure of a control unit.

The structure of the server 10 will be next described with reference to FIGS. 2 and 3. The server 10, which, for example, provides content to users, includes a communication unit 11, a storage unit 12, and a control unit 13. The communication unit 11 communicates with user terminals 40 and other communication units through the network 30. For example, the communication unit 11 receives various types of information (content, meta information assigned to the content, and the like) sent (uploaded) from user terminals 40 and other communication units and outputs the received information to the control unit 13.

The storage unit 12 stores programs used by the server 10 to perform processing and also stores various types of information. For example, the storage unit 12 stores user relationship information that indicates relationships among users.

An exemplary relationship among users may indicate that users are family members or form a group of friends (such as friends in a social networking service (SNS)) or that a user has left a history of a visit to the SNS site of another user (indicates that the user has browsed the SNS site). The user relationship information is sent from users to the server 10. The server 10 creates user relationship information according to, for example, the content browsing situation of the user.

The control unit 13 not only controls the elements constituting the server 10 but also functions as a content managing unit 131, a content analyzing unit 132, a cluster creating unit 133, a content search unit 134, a sharing unit 135, and a meta tag assignment unit 136.

The content managing unit 131 carries out any processing related to content other than processing carried out by the content analyzing unit 132, cluster creating unit 133, content search unit 134, sharing unit 135, and meta tag assignment unit 136, which will be described later. For example, the content managing unit 131 stores content and its meta information given from the communication unit 11 in the storage server 20 in relation to each other. The content managing unit 131 also acquires content and its meta information from the storage server 20 and sends them through the communication unit 11 to user terminals 40. The content managing unit 131 also stores user relationship information sent from users in the storage unit 12. The content managing unit 131 also creates user relationship information according to, for example, the content browsing situation of the user and stores the created user relationship information in the storage unit 12. When user A has browsed the blog of user B, for example, the content managing unit 131 creates user relationship information indicating that user A has browsed the content of user B.

The content analyzing unit 132 acquires content from the storage server 20 and analyzes the content to extract meta information, that is, analysis meta information described above, from the content. When image content is included in content, for example, the content analyzing unit 132 performs face recognition processing on the image content to identify a person drawn on the image content. The content analyzing unit 132 then assigns person information (such as a name) specific to the identified person to the content as the meta information.

When image content is included in content, the content analyzing unit 132 performs scene recognition processing on the image content to identify a subject (other than a person) drawn on the image content. The content analyzing unit 132 then assigns subject information (such as a subject name) specific to the content as the meta information.

When text information is included in content, the content analyzing unit 132 performs morphological analysis processing on the text information to extract a word from the text information. The content analyzing unit 132 then assigns the extracted word to the content as the meta information.

When voice content is included in content, the content analyzing unit 132 performs voice recognition processing on the voice content to identify a person indicated by the voice content. The content analyzing unit 132 then assigns person information specific to the identified person to the content as the meta information.

The cluster creating unit 133 clusters content for each user. Specifically, the cluster creating unit 133 acquires time information and positional information from all content possessed by a user. The cluster creating unit 133 then combines content items created in the same period into a single cluster, that is, a single event cluster according to the time information (this process is called event clustering). For example, the cluster creating unit 133 acquires any one content item as event-intensive content and combines the event-intensive content and content items created within one week before and after the creation of the event-intensive content into a single event cluster.

Furthermore, the cluster creating unit 133 performs processing described below for each event cluster. Specifically, the cluster creating unit 133 combines content items, in the event cluster, that have been created in the vicinity of one another into a single cluster, that is, a single event and position cluster according to the positional information (this processing is called position clustering). For example, the cluster creating unit 133 acquires any one content item from the event cluster as position-intensive content and combines the position-intensive content and content items, in the event cluster, that have been created in an the area within a radius of 1 km of the position at which the position-intensive content has been created into a single event and position cluster. There may be a case in which only one content item constitutes the event and position cluster.

The cluster creating unit 133 stores the event and position cluster in the storage server 20. In practice, the cluster creating unit 133 assigns meta information indicating a clustering result to each content item in the storage server 20. The meta information identifies the content items in the same event and position cluster.

The content search unit 134 acquires one event and position cluster (also simply referred to below as the cluster) from the storage server 20 and uses it as the reference cluster (reference content). The content search unit 134 then searches for the related cluster (related content) related to the reference cluster from all clusters (compared content) stored in the storage server 20.

The content search unit 134 performs processing that enables a plurality of users to share the reference cluster and its related clusters. Specifically, the content search unit 134 assigns meta information to the reference cluster and its related clusters, the meta information identifying the users that share these clusters.

The meta tag assignment unit 136 extracts the meta information from the related cluster and sets the meta information as the name of the reference cluster (meta tag information)

1-3. Structure of User Terminal

Figure 4:
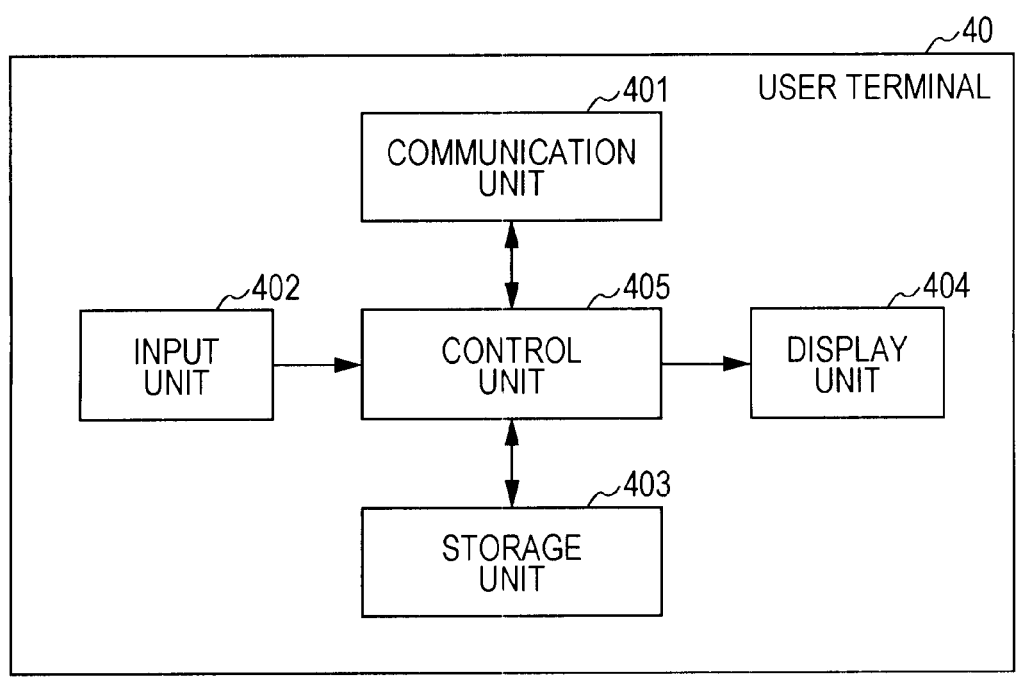
FIG. 4 is a block diagram illustrating the structure of a user terminal.

Next, the structure of the user terminal 40 will be described with reference to FIG. 4. The user terminal 40 includes a communication unit 401, an input unit 402, a storage unit 403, a display unit 404, and a control unit 405. The communication unit 401 communicates with the server 10 through the network 30. The input unit 402, which is, for example, a combination of a keyboard and a mouse, outputs manipulation information to the control unit 405 according to the user's manipulation. The storage unit 403 stores information to be used in processing performed by the control unit 405, such as programs. The display unit 404, which is a so-called display, displays various types of information. The control unit 405 controls the elements constituting the user terminal 40.

Each user can use the user's own user terminal 40 to create content (such as a blog or short blog) and upload it to the storage server 20. For example, the user manipulates the input unit 402 to input content and its meta information to the user terminal 40. Alternatively, with the user terminal 40 connected to another communication unit (such as a digital camera or mobile telephone), the user can input content (such as photograph content) and its meta information from the other communication unit to the user terminal 40. The control unit 405 incorporates user information (such as a user ID) into the meta information and outputs the content and meta information to the communication unit 401. The communication unit 401 sends the content and meta information to the server 10. The communication unit 11 in the server 10 receives the content and meta information and outputs them to the content managing unit 131. The content managing unit 131 stores the content and meta information in the storage server 20 for each user.

Each user can also browse user's own content and content that the user is sharing with other users. For example, the user manipulates the input unit 402 to input content browsing request information that asks for the browsing of content. The control unit 405 adds user information to the content browsing request information and outputs the resulting content browsing request information to the communication unit 401. The communication unit 401 sends the content browsing request information to the server 10.

The communication unit 11 in the server 10 outputs the content browsing request information to the content managing unit 131. The content managing unit 131 acquires, from the storage server 20, content possessed by the user, content that the user is sharing with other users, and meta information assigned to these content items according to the content browsing request information. Content is searched for according to the meta information. This is because meta information includes user information as described above and also includes sharing information indicating users with which the content is to be shared. Therefore, the content managing unit 131 can acquire, from the storage server 20, content possessed by the user and content that the user is sharing with other users, according to the meta information. The content managing unit 131 outputs the acquired content and meta information to the communication unit 11. The communication unit 11 sends the content and meta information to the user terminal 40. The communication unit 401 in the user terminal 40 receives the content and meta information and outputs them to the control unit 405. The control unit 405 displays the content received from the communication unit 401 on the display unit 404 for each cluster.

Some examples of images displayed on the display unit 404 will be described with reference to FIGS. 8 to 10. FIG.

8 is an example of an image displayed on the display unit 404 of user A. In this example, a photograph cluster list image 500 is displayed on the display unit 404.

The photograph cluster list image 500 is divided into a plurality of photograph cluster display areas 501. In each photograph cluster display area 501, a photograph cluster 502 formed with one or a plurality of photograph content items 503, meta tag information 504, and time information 505 are displayed. User A can reference the photograph cluster list image 500 and can, for example, edit or browse each photograph cluster 502.

Figure 8:
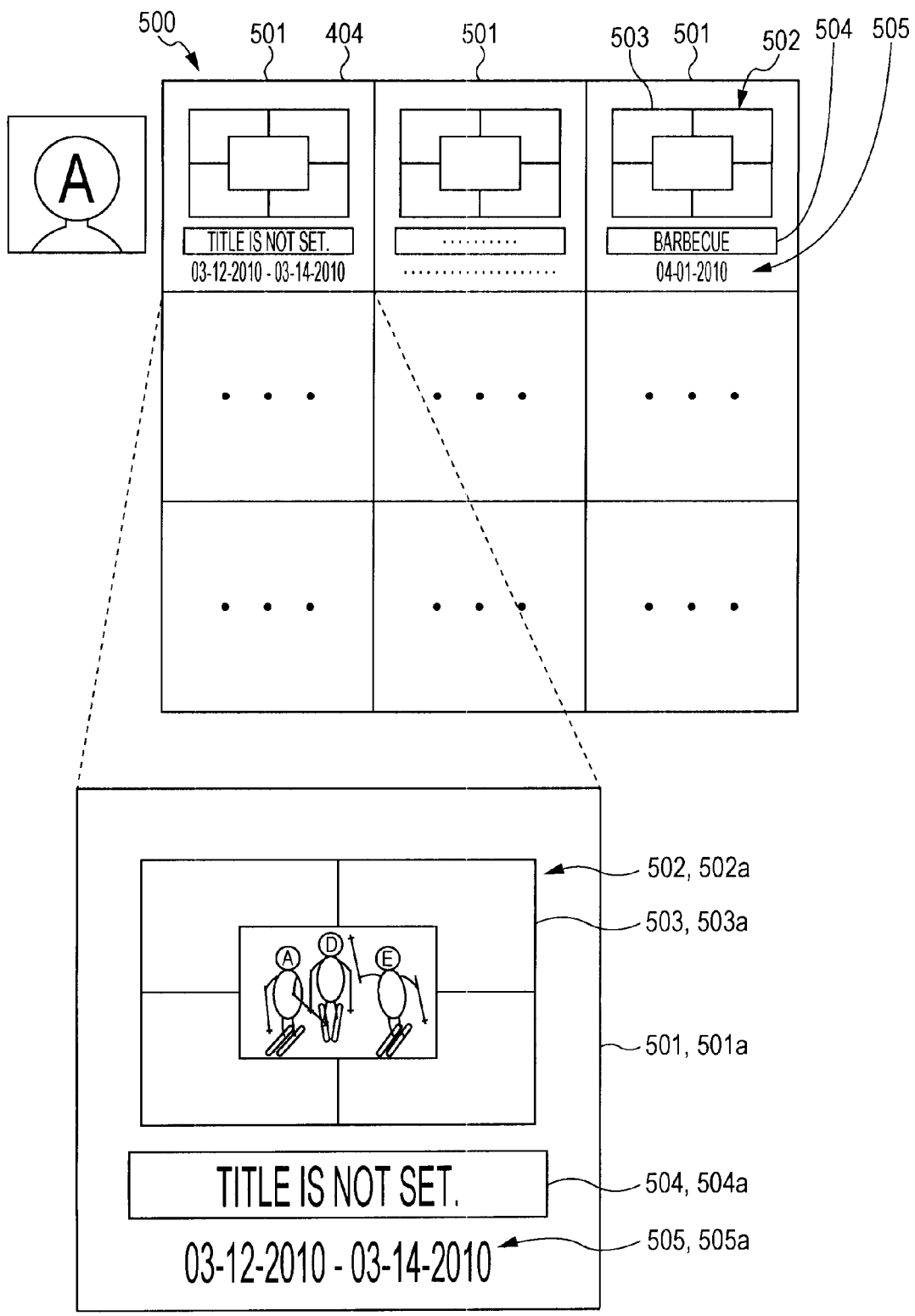
FIG. 8 is an example of an image displayed on the user terminal.

In a magnified example in FIG. 8, meta tag information 504a is not set in a cluster display area 501a. When the meta tag information 504a is not set, the server 10 can show meta information candidates to have the user set meta tag information.

Time information 505a indicates a time interval from Mar. 12, 2010 to Mar. 14, 2010. That is, a photograph cluster 502a displayed in this cluster display area 501a includes photograph content items 503a created in a time interval from Mar. 12, 2010 to Mar. 14, 2010. Although not displayed in this example, the positional information in all the content items 503a indicates the same place, Myoko in Nigata City, for example.

Figure 9:
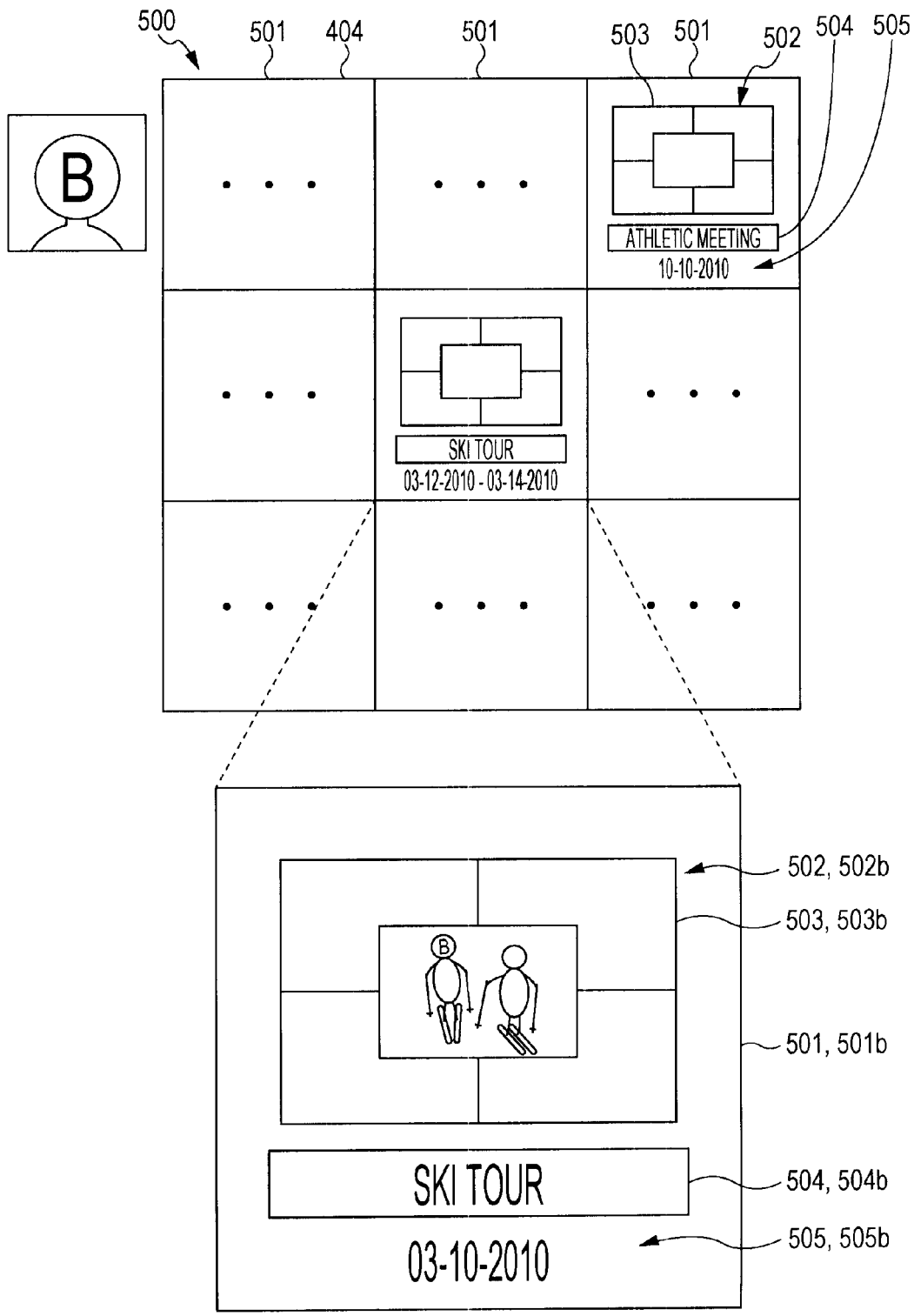
FIG. 9 is another example of an image displayed on the user terminal.

FIG. 9 is an example of an image displayed on the display unit 404 of user B. In this example as well, a photograph cluster list image 500 is displayed on the display unit 404. In a magnified example in FIG. 9, however, meta tag information 504b in a cluster display area 501b is "SKI TOUR".

Time information 505b indicates Mar. 10, 2010. That is, a photograph cluster 502b displayed in a cluster display area 501b includes photograph content items 503b created on Mar. 10, 2010. Although not displayed in this example, the positional information in all the content items 503b indicates the same place, Myoko in Nigata City, for example. That is, the photograph cluster 502a and photograph cluster 502b were created in the same period and in the vicinity of each other. Thus, when creating meta tag information candidates, the server 10 references the photograph cluster 502b and the meta information to be assigned to the photograph cluster 502b.

Figure 10:
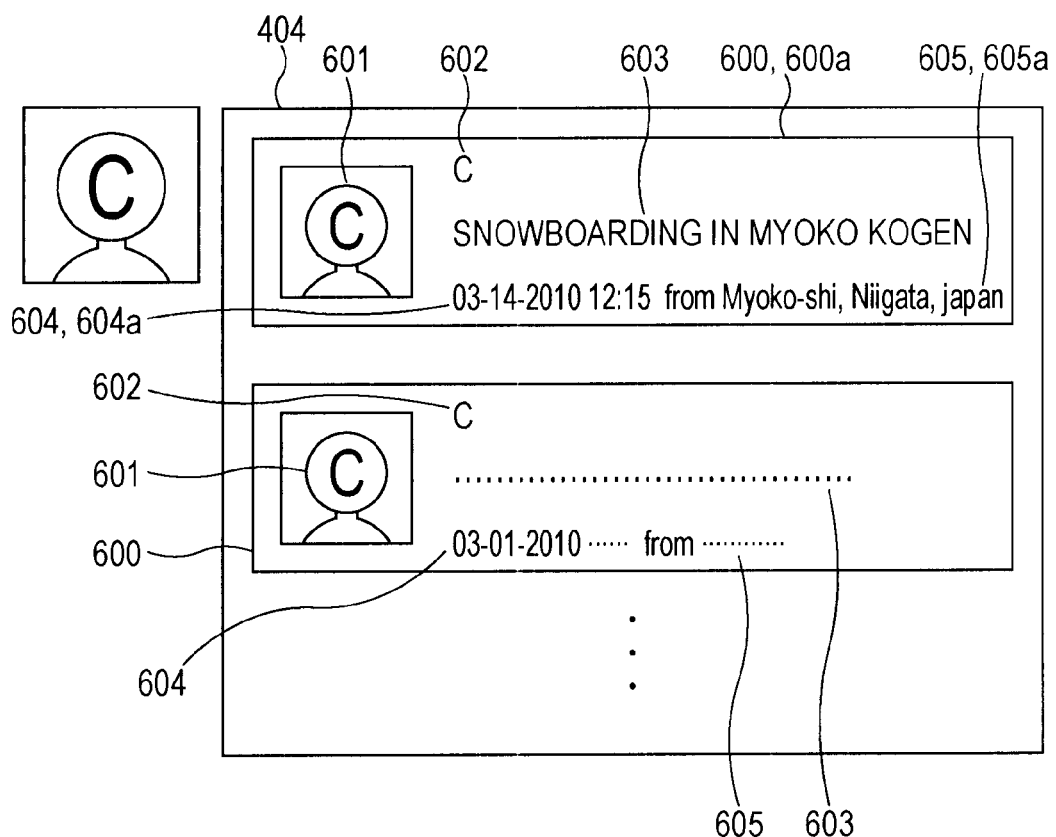
FIG. 10 is another example of an image displayed on the user terminal.

FIG. 10 is an example of an image displayed on the display unit 404 of user C. In this example, a plurality of short blogs 600 are displayed on the display unit 404. Each short blog 600 includes thumbnail information 601 of user C, name information 602 of user C, short blog text 603, time information 604, and positional information 605. The short blog text 603 is the text of a short blog created by user C. In a short blog 600a, for example, time information 604a indicates Mar. 14, 2010 and positional information 605a indicates Myoko in Nigata City. That is, the photograph cluster 502a and short blog 600a were created in the same period and in the vicinity of each other. Thus, when creating meta tag information candidates, the server 10 references the short blog 600a and the meta information to be assigned to the short blog 600a.

2. Procedures of Processing Executed by Information Processing System

Procedures of processing executed by the information processing system 1 will be described below. The information processing system 1 mainly performs content analyzing processing, cluster creating processing, and service providing processing.

2-1. Procedure for Analyzing Content

Figure 5:
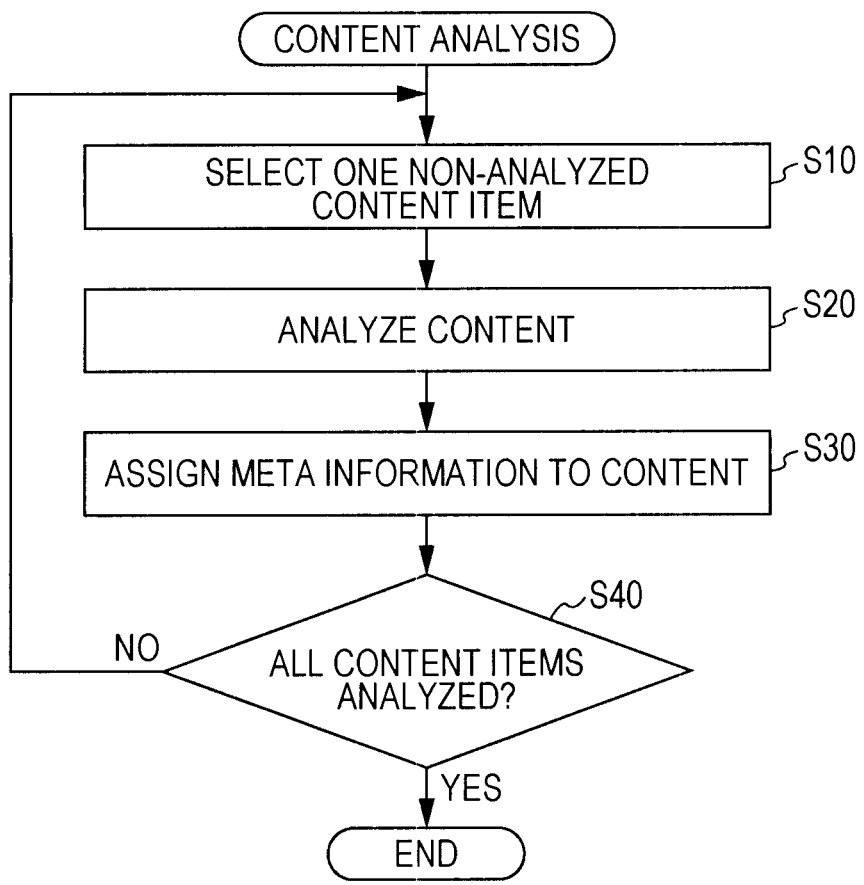
FIG. 5 is a flowchart illustrating a procedure of processing executed by the information processing system.

Content analyzing processing will be first described with reference to FIG. 5.

The content analyzing unit 132 acquires one non-analyzed content item from the storage server 20 in step S10. The content analyzing unit 132 then analyzes the non-analyzed content in step S20 to extract meta information, that is, the analysis meta information described above, from the non-analyzed content.

When image content is included in content, for example, the content analyzing unit 132 performs face recognition processing on the image content to identify a person drawn on the image content. The content analyzing unit 132 then assigns person information (such as a name) specific to the identified person to the content as the meta information. If user B has the photograph content 503b shown in FIG. 9, for example, the content analyzing unit 132 analyzes the photograph content 503b and acquires person information about user B.

When image content is included in content, the content analyzing unit 132 performs scene recognition processing on the image content to identify a subject (other than a person) drawn on the image content. The content analyzing unit 132 then acquires subject information (such as a subject name) specific to the content as the meta information.

When text information is included in content, the content analyzing unit 132 performs morphological analysis processing on the text content to extract words from the text information. The content analyzing unit 132 then acquires the extracted word as the meta information. If user C has the short blog 600a shown in FIG. 10, for example, the content analyzing unit 132 analyzes text information "SNOWBOARDING IN MYOKO KOGEN" and acquires word information items MYOKO KOGEN and SNOWBOARDING.

When voice content is included in content, the content analyzing unit 132 performs voice recognition processing on the voice content to identify a person indicated by the voice content. The content analyzing unit 132 then acquires person information specific to the identified person as the meta information.

In step S30, the content analyzing unit 132 assigns the analysis meta information and analyzed meta information, which indicates that the content has been analyzed, to the non-analyzed content and stores the non-analyzed content in the storage server 20.

The content analyzing unit 132 decides in step S40 whether all content items in the storage server 20 have been analyzed. If the content analyzing unit 132 decides that all content items have been analyzed, the content analyzing unit 132 terminates content analysis processing. If the content analyzing unit 132 decides that there is content yet to analyze, the content analyzing unit 132 returns to step S10.

2-2. Procedure for Creating Cluster

Figure 6:
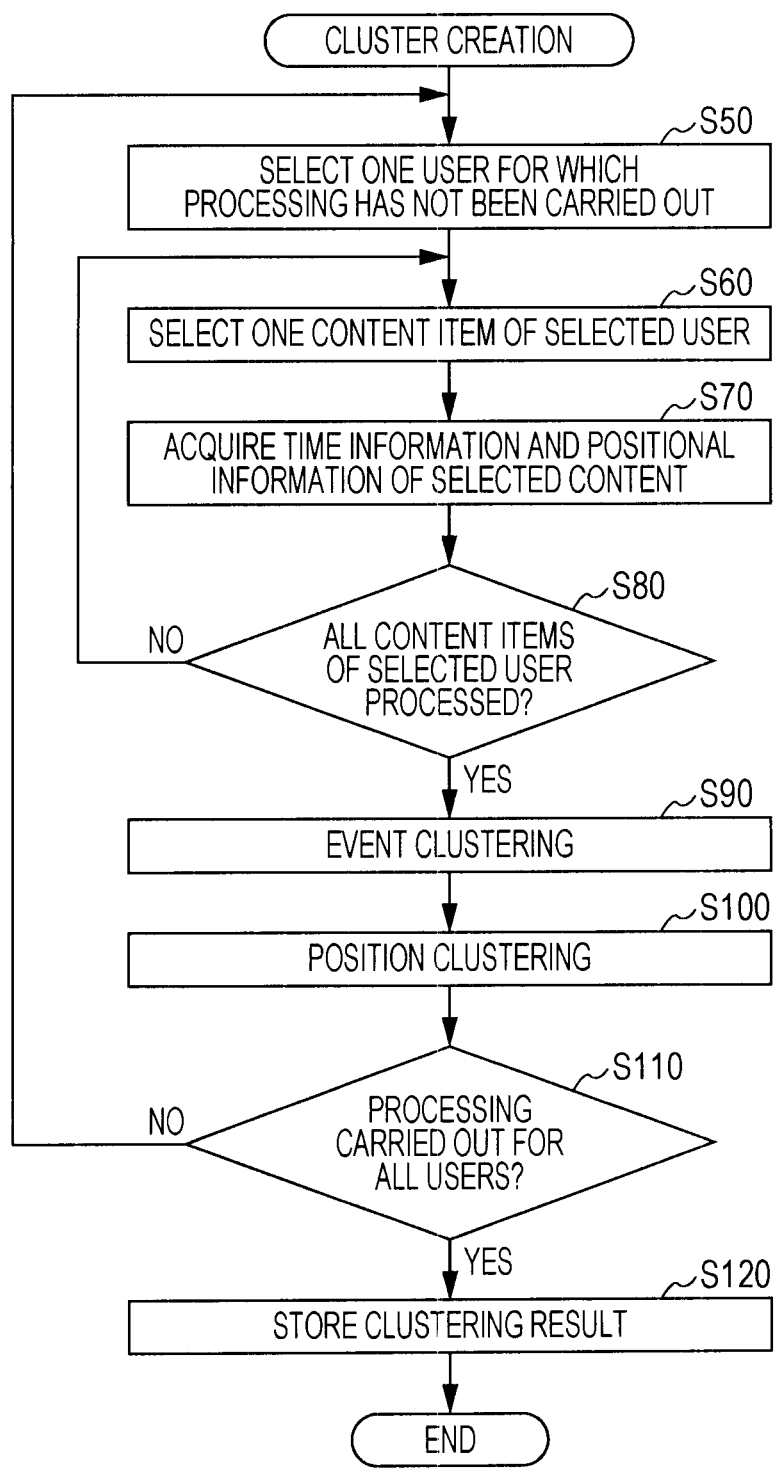
FIG. 6 is another flowchart illustrating a procedure of processing executed by the information processing system.

The procedure for creating a cluster will be described below with reference to FIG. 6. In step S50, the cluster creating unit 133 selects one user for which processing has not been carried out (that is, for which processing in steps S60 to S100 have yet to be carried out).

The cluster creating unit 133 selects one content item of the selected user from the storage server 20 in step S60. The cluster creating unit 133 then acquires the time information and positional information of the selected content in step S70. The cluster creating unit 133 decides in step S80 whether processing in steps S60 to S70 has been carried out for all content items possessed by the selected user. If the cluster creating unit 133 decides that processing in steps S60 to S70 have been carried out for all content items, the cluster creating unit 133 proceeds to step S90. If the cluster creating unit 133 decides that there is content yet to process, the cluster creating unit 133 returns to step S60.

The cluster creating unit 133 then performs event clustering in step S90. Specifically, the cluster creating unit 133 combines content items created in the same period into a single cluster, that is, a single event cluster, according to the time information. For example, the cluster creating unit 133 acquires any one content item as event-intensive content and combines the event-intensive content and content items created within one week before and after the creation of the event-intensive content into a single event cluster.

The cluster creating unit 133 performs position clustering for each event cluster in step S100. Specifically, the cluster creating unit 133 combines content items, in the event cluster, that have been created in the vicinity of one another into a single cluster, that is, a single event and position cluster, according to the positional information. For example, the cluster creating unit 133 acquires any one content item from the event cluster as position-intensive content and combines the position-intensive content and content items, in the event cluster, that have been created in an area within a radius of 1 km of the position at which the position-intensive content has been created into a single event and position cluster. There may a case in which only one content item constitutes the event and position cluster.

The cluster creating unit 133 decides in step S110 whether processing in steps S60 to S100 has been carried out for all users. If the cluster creating unit 133 decides that processing in steps S60 to S100 has been carried out for all users, the cluster creating unit 133 proceeds to step S120. If not, the cluster creating unit 133 returns to step S50.

In step S120, the cluster creating unit 133 stores the event and position cluster in the storage server 20. In practice, the cluster creating unit 133 assigns meta information, which indicates a clustering result, to each content item in the storage server 20. The meta information identifies the content items in the same event and position cluster.

2-3. Procedure for Providing Service

Figure 7:
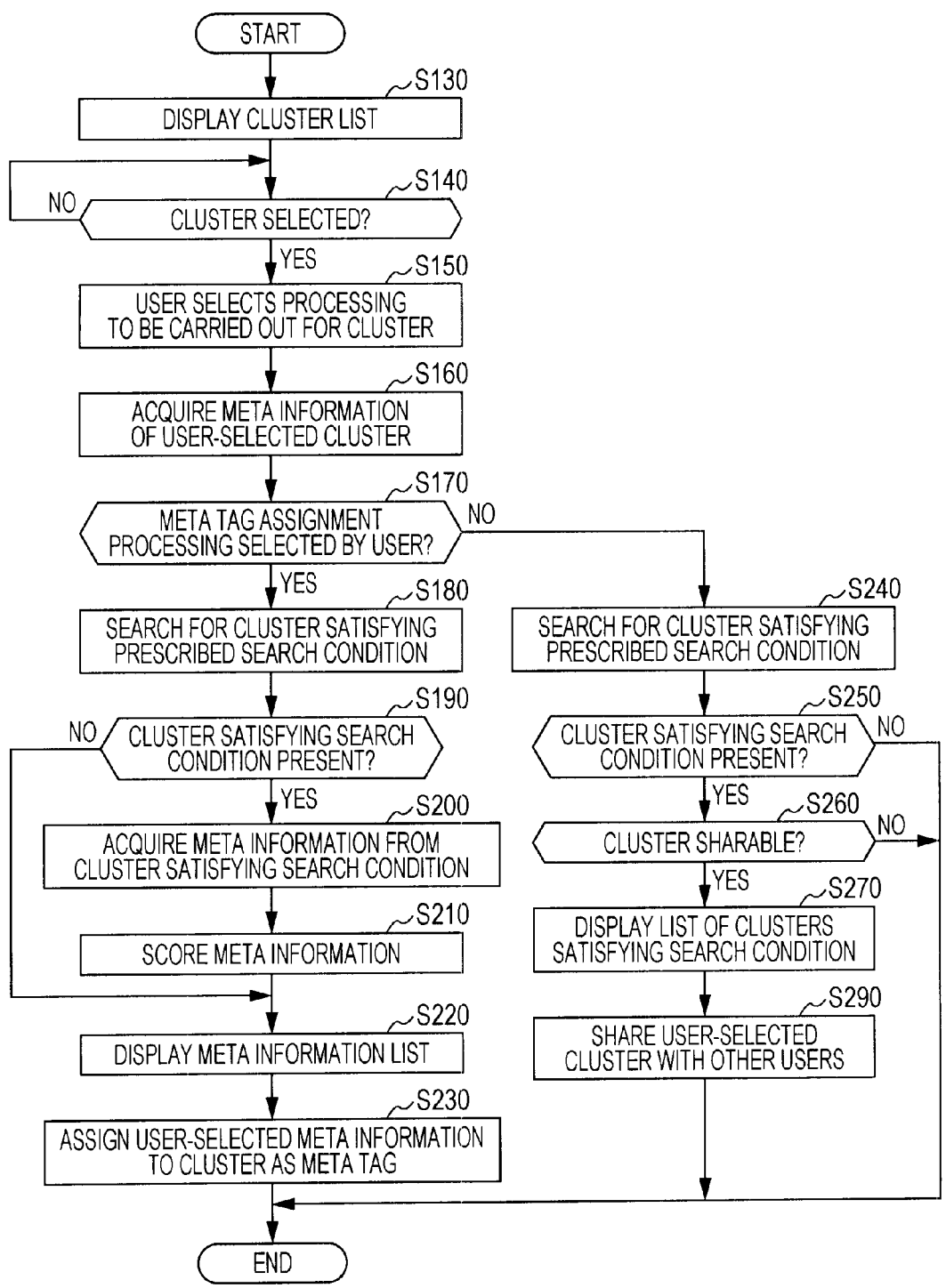
FIG. 7 is another flowchart illustrating a procedure of processing executed by the information processing system.

The procedure for providing a service will be described below with reference to FIG. 7. In service providing processing, one of meta tag assignment processing for assigning a meta tag to a cluster having no meta tag and cluster sharing processing for sharing content (cluster) with other users is carried out according to the choice of the user. Service providing processing for user A will be described below as an example of service providing processing. Service providing processing is carried after content analyzing processing and cluster creating processing described above have been completed.

In step S130, user A manipulates the input unit 402 to input content browsing request information that asks for the browsing of content. The control unit 405 adds user information to the content browsing request information and outputs the resulting content browsing request information to the communication unit 401. The communication unit 401 sends the content browsing request information to the server 10.

The communication unit 11 in the server 10 outputs the content browsing request information to the content managing unit 131. The content managing unit 131 acquires, from the storage server 20, content possessed by user A, content that user A is sharing with other users, and meta information assigned to these content items according to the content browsing request information.

The content managing unit 131 outputs the acquired content and meta information to the communication unit 11. The communication unit 11 sends the content and meta information to the user terminal 40. The communication unit 401 in the user terminal 40 receives the content and meta information and outputs them to the control unit 405. The control unit 405 displays the content received from the communication unit 401 on the display unit 404 for each cluster. For example, the control unit 405 displays the photograph cluster list image 500 shown in FIG. 8 on the display unit 404.

The control unit 405 waits in step S140 until user A selects any one cluster. User A places a mouse pointer (not shown) on a desired cluster and clicks the mouse button to select the cluster. When the photograph cluster list image 500 shown in FIG. 8 is being displayed on the display unit 404, for example, user A can select the photograph cluster 502a.

Figure 11:
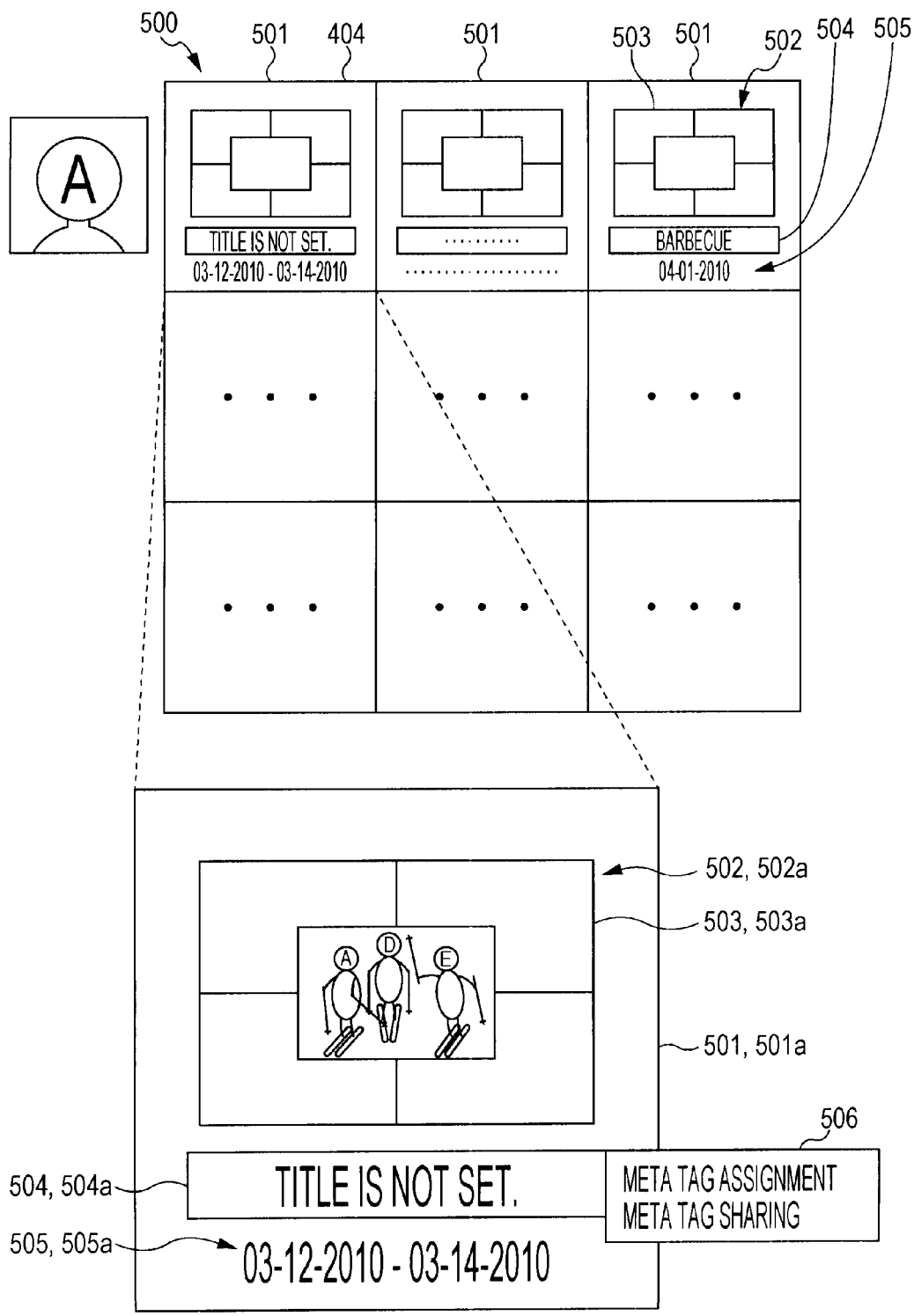
FIG. 11 is another example of an image displayed on the user terminal.

In step S150, the control unit 405 has user A select processing to be performed for a cluster. For example, the control unit 405 displays a processing selection list image 506 shown in FIG. 11 on the display unit 404. The processing selection list image 506 is an image created by drawing, in list form, a text image in meta tag assignment processing and a text image in cluster sharing processing. User A selects any processing from the processing selection list image 506. For example, to select desired processing, user A places the mouse pointer (not shown) on the text image representing the desired processing and clicks the mouse button.

In step S160, the control unit 405 creates processing request information related to the cluster and processing selected by user A, and outputs the information to the communication unit 401. The communication unit 401 receives the processing request information and sends it to the server 10. The communication unit 11 in the server 10 receives the processing request information and outputs it to the content search unit 134. The content search unit 134 identifies the cluster selected by user A according to the processing request information and acquires meta information of the identified cluster from the storage server 20.

The content search unit 134 decides in step S170 whether the processing selected by user A is meta tag assignment processing, according to the processing request information. If the content search unit 134 decides that user A has selected meta tag assignment processing, the content search unit 134 proceeds to step S180. If the content search unit 134 decides that user A has selected cluster sharing processing, the content search unit 134 proceeds to step S240.

Assuming that the cluster selected by user A is a reference cluster and the clusters stored in the storage server 20 are compared clusters, the content search unit 134 acquires meta information, that is, compared meta information, from the compared clusters in step S180. The compared clusters include non-reference clusters possessed by user A as well. The content search unit 134 then searches for related clusters related to the reference cluster from the compared cluster according to the meta information of the reference content, that is, the reference meta information, and to the compared meta information.

That is, the content search unit 134 identifies a reference cluster creation time, which is a time at which a reference cluster was created. For example, the content search unit 134 uses the creation time of a certain content item included in the reference cluster, that is, of a certain reference content item, as the reference cluster creation time. The content search unit 134 may use a barycenter (arithmetic average) of the creation times of reference content items as the reference cluster creation time.

Similarly, the content search unit 134 identifies a compared cluster creation time, which is a time at which the compared cluster was created. For example, the content search unit 134 uses the creation time of a certain content item included in the compared cluster, that is, of a certain compared content item, as the compared cluster creation time. The content search unit 134 may use a barycenter of the creation times of compared content items as the compared cluster creation time.

The content search unit 134 calculates a time elapsed from the reference cluster creation time to the compared cluster creation time and decides whether the calculated time falls within a prescribed range (within one week before and after the reference cluster creation time, for example) (time condition 1).

The content search unit 134 further decides whether the time elapsed from the reference cluster creation time to the compared cluster creation time is a prescribed value (or a value in a prescribed range centered around the prescribed value) (time condition 2). The content search unit 134 sets the prescribed value according to the reference cluster. If the reference cluster includes content items concerning cherry blossom viewing and ski tours, for example, the content search unit 134 sets the prescribed value to ±1 year. This is because cherry blossom viewing and a ski tour are highly likely to be carried out once a year, so it is highly likely that like content items were created one year ago and like content items will be created one year later. This decision is made by, for example, using a table. Specifically, a table indicating correspondence between the reference cluster and prescribed values is prestored in the storage unit 12. The content search unit 134 can determine a prescribed value with reference to this table.

The content search unit 134 calculates a time evaluation value $E_1$, which indicates the time elapsed from the reference cluster creation time to the compared cluster creation time, according to equation (1) below.

$$E_1 = a_1 \times X_1 \tag{1}$$

where $X_1$ is a preset positive real number, and $a_1$ is set to 1 when time condition 1 described above is satisfied, 0.5 when time condition 1 is not satisfied but time condition 2 described above is satisfied, or 0 when neither time condition 1 nor time condition 2 is satisfied. Equation (1) indicates that, for example, the shorter the time elapsed from the reference cluster creation time to the compared cluster creation time is, the larger the time evaluation value $E_1$ is, for example. This is because it may be that the shorter the time elapsed from the reference cluster creation time to the compared cluster creation time is, the larger the degree of a relationship (similarity) between the reference cluster and the compared cluster is.

The time evaluation value $E_1$ may change in a continuous manner according to the time elapsed from the reference cluster creation time to the compared cluster creation time. In this case as well, the shorter the time elapsed from the reference cluster creation time to the compared cluster creation time is, the larger the time evaluation value $E_1$ is.

The content search unit 134 further identifies a related cluster creation position, which is a position at which the reference cluster has been created. For example, the content search unit 134 uses the creation position of a certain content item included in the reference cluster, that is, of a certain reference content item, as the related cluster creation position. The content search unit 134 may use a barycenter of the creation positions of the reference content items as the reference cluster creation position.

Similarly, the content search unit 134 identifies a compared cluster creation position, which is a position at which a compared cluster has been created. For example, the content search unit 134 uses the creation position of a certain content item included in the compared cluster, that is, of a certain compared content item as the compared cluster creation position. The content search unit 134 may use a barycenter of the creation positions of the compared content items as the compared cluster creation position.

The content search unit 134 calculates a distance from the reference cluster creation position to the compared cluster creation position and decides whether the calculated distance falls within a prescribed range (within a radius of 1 km of the reference cluster creation position, for example) (distance condition).

The content search unit 134 calculates a distance evaluation value $E_2$, which indicates the distance from the reference cluster creation position to the compared cluster creation position, according to equation (2) below.

$$E_2 = a_2 \times X_2 \tag{2}$$

where $X_2$ is a preset positive real number, and $a_2$ is set to 1 when the distance condition described above is satisfied or 0 when the distance condition not satisfied.

Equation (2) indicates that the shorter the distance from the reference cluster creation position to the compared cluster creation position is, the larger the distance evaluation value $E_2$ is. This is because it may be that the shorter the distance from the reference cluster creation position to the compared cluster creation position is, the larger the degree of a relationship (similarity) between the reference cluster and the compared cluster is.

The distance evaluation value $E_2$ may change in a continuous manner according to the distance from the reference cluster creation position to the compared cluster creation position. In this case as well, the shorter the distance from the reference cluster creation position to the compared cluster creation position is, the larger the distance evaluation value $E_2$ is.

The content search unit 134 further calculates a person information evaluation value $E_3$ represented by equation (3) below according to the person information included in the compared content. The person information, which is meta information of the compared content, is acquired by the content analyzing unit 132.

$$E_3 = a_3 \times X_3 \tag{3}$$

where $X_3$ is a preset positive real number, and $a_3$ is set to 1 when the person information related to user A is included in at least a prescribed part (80 percent, for example) of the compared content items in the compared cluster or 0 when it is not. The person information evaluation value $E_3$ is used, for example, to search for compared clusters including many photograph content items, as related clusters, that satisfy none of time conditions 1 and 2 and the distance condition but in which user A is captured. A possible example of a compared cluster that enlarges the person information evaluation value $E_3$ is a photograph cluster obtained when another user in the family of user A photographs user A. The person information to be included in the compared content may be set by the user. When user A wants to share a photograph content in which user D is captured, user D is set as the person information that becomes a decision criterion of the person information evaluation value $E_3$. Specifically, user A inputs command information indicating the sharing of photograph content in which user D is captured to the input unit 402. The control unit 405 outputs the command information to the communication unit 401, and the communication unit 401 outputs the command information to the server 10. The content search unit 134 in the server 10 receives the command information and sets $a_3$ according to it, that is, sets $a_3$ to 1 when person information related to user D is included in at least a prescribed part (80 percent, for example) of the compared content items in the compared cluster or 0 when it is not.

When the meta information of the reference content and the meta information of the compared content both include communication information, the content search unit 134 calculates a communication information evaluation value $E_4$ represented by equation (4) below according to the communication information.

$$E_4 = a_4 \times X_4 \qquad (4)$$

where $X_4$ is a preset positive real number, and $a_4$ is set to 1 when communication has been carried out between the mobile terminal device used to create the reference content and the mobile terminal device used to create the compared content or 0 when it is not. When these mobile communication devices have communicated with each other, it is highly likely that user A and the user of the compared cluster have participated in the same event, so the degree of a relationship with the compared cluster can be considered to be large. Therefore, the communication information evaluation value $E_4$ is set like this.

The content search unit 134 calculates a user relation evaluation value $E_5$ represented by equation (5) below according to the relationship between user A and the user of the compared content.

$$E_5 = a_5 \times X_5 \qquad (5)$$

where $X_5$ is a preset positive real number, and $a_5$ is set to 1 when user A and the user of the compared cluster are family members, 0.7 when user A and the user of the compared cluster are not family members but form a friend group or another group, 0.4 when the user of the compared cluster has left a history of a visit to the blog of user A, or 0 in other cases. Therefore, the closer the relationship between users is, the larger the user relation evaluation value $E_5$ is. This is because it may be that the closer the relationship between users is, the larger the degree of the relationship with the compared cluster is.

The content search unit 134 calculates a total evaluation value $E_0$ represented by equation (6) below. The total evaluation value $E_0$ indicates the degree of the relationship between related content and reference content.

$$E_0 = E_1 + E_2 + E_3 + E_4 + E_5 \qquad (6)$$

The content search unit 134 uses, as a search condition, a condition that the total evaluation value $E_0$ exceeds a prescribed evaluation criterion to decide a compared cluster satisfying the search condition as a related cluster. Thus, the content search unit 134 searches for related clusters from compared clusters. If user B has the photograph cluster 502*b* shown in FIG. 9 and user C has the short blog 600*a* shown in FIG. 10, these clusters are highly likely to be used as related clusters because these clusters have been created in the vicinity of the photograph cluster 502*a*, which is the reference content, and in the same period.

As described above, the content search unit 134 can search for related clusters by using the relatively simple evaluation method, in which the time evaluation value $E_1$ and the like are used, so the content search unit 134 can search for related clusters without investigating details of compared clusters. Therefore, the content search unit 134 can search for related clusters without using advanced recognition technology.

The content search unit 134 can change the weights of the evaluation values by changing the values of real numbers $X_1$ to $X_5$ described above. When distance and time are important, that is, $E_1$ and $E_2$ are important, the content search unit 134 makes the values of real numbers $X_1$ and $X_2$ larger than the values of real numbers $X_3$ to $X_5$. The values of real numbers $X_1$ to $X_5$ may be automatically set by the content search unit 134 or may be set by the user.

A plurality of evaluation criteria may be set. For example, if the content search unit 134 fails to obtain meta information desired by the user from the related content items searched for with a first prescribed value, the content search unit 134 may search for related content items with second and later evaluation criteria having values lower than the first evaluation criterion.

When the weights are changed in this way, the content search unit 134 can search for compared clusters, as related cluster, that have the same creation position as the reference cluster but having different creation times from the reference cluster and can also search for compared clusters, as related cluster, that have the same creation time as the reference cluster but have different creation positions from the reference cluster. When different users performed the same event in the same period but at different positions (when different users captured a solar eclipse at different positions, for example), the creation positions of the compared clusters differ from the creation position of the reference cluster, but the compared clusters and reference cluster have the same creation time. By contrast, when different users performed the same event in different periods but at the same position (when different users played in the same theme park at different times, for example), the creation times of the compared clusters differ from the creation time of the reference cluster, but the compared clusters and reference cluster have the same creation position.

In step S190, the content search unit 134 decides whether there is a compared cluster satisfying the search condition, that is, a related cluster. If the content search unit 134 decides that there is a related cluster, the content search unit 134 proceeds to step S200. If the content search unit 134 decides that there is no related cluster, the content search unit 134 proceeds to step S220. The content search unit 134 acquires meta information from content items constituting the related cluster, that is related content items, in step S200.

In step S210, the content search unit 134 scores each meta information item obtained in step S200. The score of each meta information item, that is, an evaluation value, is the total evaluation value $E_0$ of the related content items related to the meta information (that is, the related cluster).

In step S220, the content search unit 134 creates a meta information list image, which is a list of meta information items acquired in steps S160 and S200. At that time, the content search unit 134 sorts the meta information items in descending order of their evaluation values. When an evaluation value has not been assigned to meta information (that is, when the meta information has been acquired in step S160), the content search unit 134 assumes the evaluation value of the meta information to be 0. When the content search unit 134 has acquired a plurality of meta information items from the same related cluster, the content search unit 134 may combine these meta information items into one. The evaluation value of the combined meta information may be a total of the evaluation values assigned to the meta information items before they are combined. Thus, the content search unit 134 extracts meta information from not only the reference cluster but also from the related clusters, so it can acquire a wide variety of meta information.

Figure 12:
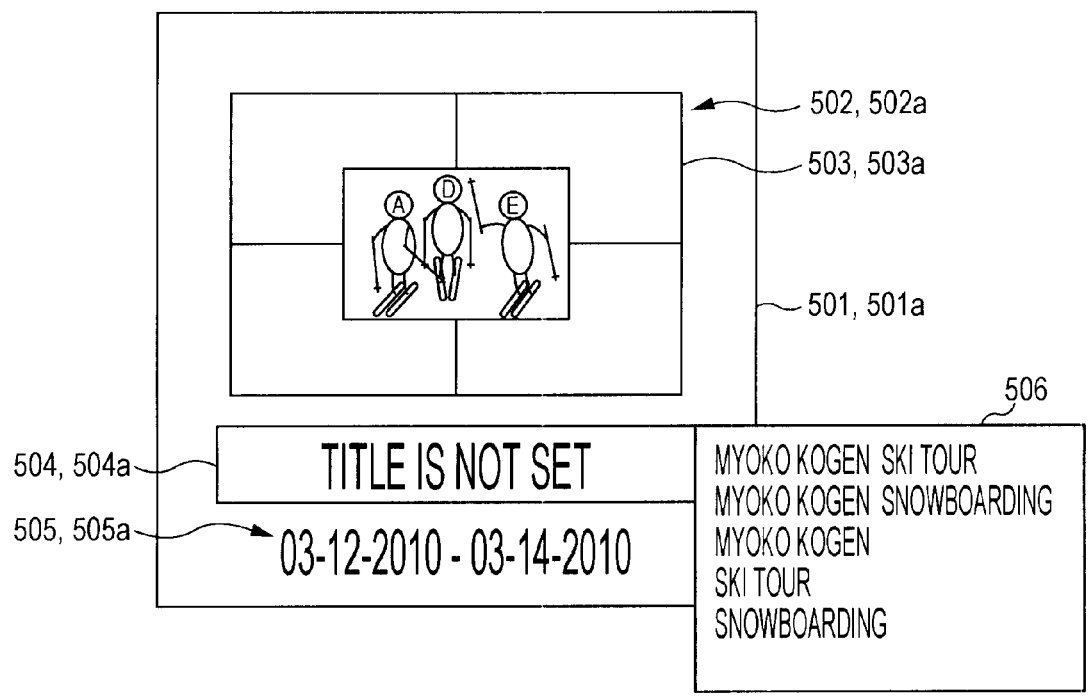
FIG. 12 is another example of an image displayed on the user terminal.

The content search unit 134 stores meta information list image information related to the meta information list image in the storage unit 12 and also outputs the information to the communication unit 11. The communication unit 11 sends the meta information list image information to the user terminal 40 of user A. The communication unit 401 in the user terminal 40 receives the meta information list image information and outputs it to the control unit 405. The control unit 405 displays the meta information list image on the display unit 404 according to the meta information list image information. FIG. 12 illustrates an example of the meta information list image, in which the meta information list image 506 is displayed on the display unit 404. In the meta information list image 506, the meta information "MYOKO KOGEN SKI TOUR", which has been acquired from the photograph cluster 502b of user B is displayed at the top.

User A selects desired meta information from the meta information items displayed in the meta information list image 506. The control unit 405 creates meta tag setting request information related to the selected meta information and outputs the created information to the communication unit 401. The communication unit 401 sends the meta tag setting request information to the server 10. The communication unit 11 in the server 10 receives the meta tag setting request information and outputs it to the meta tag assignment unit 136. Since the user terminal 40 displays the meta information list image 506 as described above, user A can select desired meta information from the meta information list image 506 and can use it as the meta tag information. That is, user A can easily set desired meta tag information. Since meta information items are listed in descending order of their evaluation values in the meta information list image 506, user A can easily determine meta tag information suitable to the reference cluster.

Figure 13:
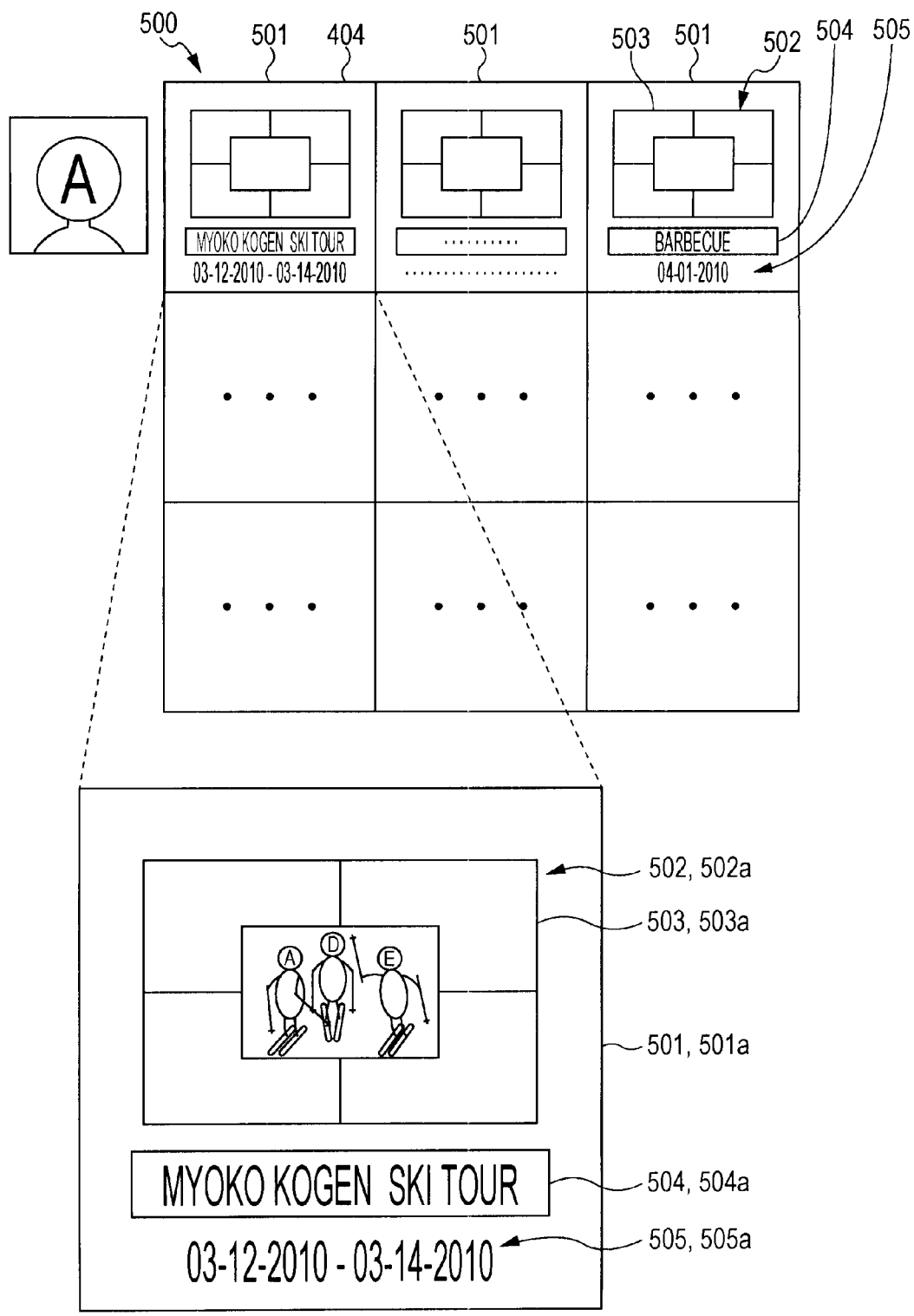
FIG. 13 is another example of an image displayed on the user terminal.

The meta tag assignment unit 136 sets the meta information selected by user A as the meta tag information (that is, the name) of the reference cluster according to the meta tag setting request information. The meta tag assignment unit 136 then assigns the meta tag information to the reference cluster as the meta information. If user A selects the meta information "MYOKO KOGEN SKI TOUR", for example, the meta information "MYOKO KOGEN SKI TOUR" is set as the meta tag information 504a of the photograph cluster 502a, as illustrated in FIG. 13.

In step S240, the content search unit 134 performs processing as in step S180 described above; compared clusters are cluster possessed by a user other than user A, however. In step S250, the content search unit 134 decides whether there is a compared cluster satisfying the search condition, that is, related cluster. If the content search unit 134 decides that there is a reference cluster, the content search unit 134 proceeds to step S260. If the content search unit 134 decides that there is no related cluster, the content search unit 134 terminates service providing processing.

In step S260, the content search unit 134 decides, for each related cluster, whether the related cluster is sharable between user A and the user of the related cluster. Specifically, the content search unit 134 decides that a related cluster satisfying one of sharing conditions 1 and 2 described below is sharable between user A and the user of the related cluster. Of course, when a related cluster satisfies both sharing conditions 1 and 2, the content search unit 134 may decide that the related cluster is sharable between user A and the user of the related cluster. The content search unit 134 may also decide that a related cluster satisfying neither sharing condition 1 nor sharing condition 2 is sharable.

Sharing condition 1: A group has been formed between user A and the user of the related cluster.

Sharing condition 2: Person information about user A is included in at least a prescribed part of the compared content items in the compared cluster.

If there is a related cluster sharable between user A and the user of the related cluster, the content search unit 134 proceeds to step S270. If not, the content search unit 134 terminates service providing processing.

In step S270, the content search unit 134 creates a related cluster list image, which lists sharable related clusters. The related cluster list image is a list of sharable related clusters displayed for each user with which related clusters can be shared. The content search unit 134 stores the related cluster list image information related to the related cluster list image in the storage unit 12 and also outputs the information to the communication unit 11. The communication unit 11 sends the related cluster list image information to the user terminal 40 of user A. The communication unit 401 in the user terminal 40 receives the related cluster list image information and outputs it to the control unit 405. The control unit 405 receives the related cluster list image information and displays the related cluster list image on the display unit 404 according to the received related cluster list image information.

Figure 14:
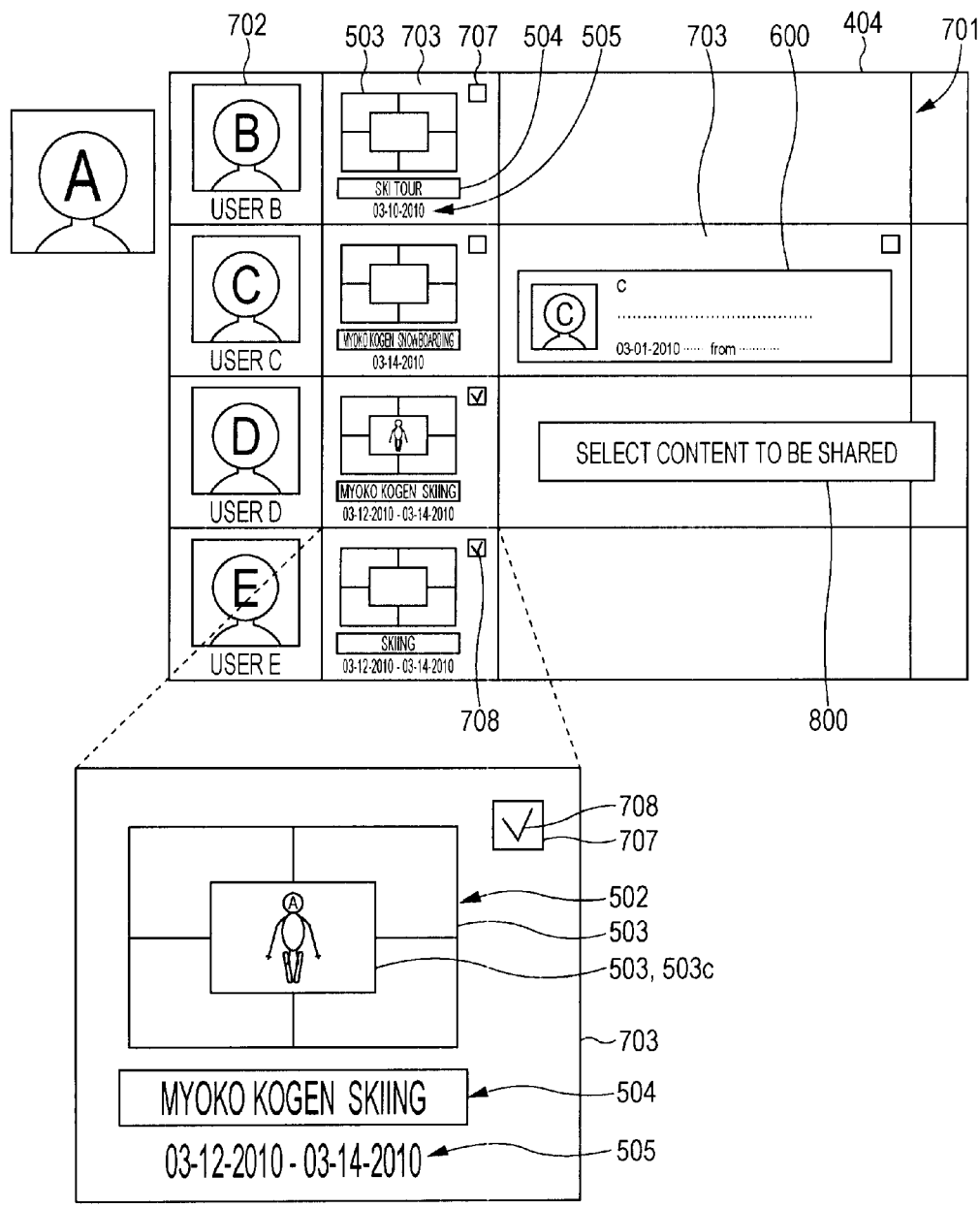
FIG. 14 is another example of an image displayed on the user terminal.

FIG. 14 illustrates an example of the related cluster list image, which is formed with one or a plurality of user-specific related cluster list images 701. Each user-specific related cluster list image 701 has a user display area 702 indicating a user with which content is to be shared and a related cluster display area 703 on which a related cluster is displayed. The user display area 702 displays a face image and person information (such as a name or user ID) of the user with which content is to be shared. The related cluster display area 703 displays related clusters such as the photograph cluster 502 and short blog 600. In addition to the related cluster list image, an explanation image 800 that encourages the user to select a related cluster is also displayed.

In each photograph cluster 502, as magnified in FIG. 14, photograph content 503c is placed as the topmost content, in which user A, that is, the user of the reference cluster, is captured. This enables user A to easily recognize that another user has photograph content on which user A is captured.

A check box 707 is displayed in each related cluster display area 703. User A can select a related cluster to be shared by placing a check mark 708 in the check box 707 of the related cluster.

The control unit 405 creates sharing request information related to the related cluster selected by user A and outputs the information to the communication unit 401. The communication unit 401 sends the sharing request information to the server 10. The server 10 receives the sharing request information and outputs it to the sharing unit 135. The sharing unit 135 enables user A to share the related cluster, which user A has selected to share, with the user of the related cluster. Specifically, the sharing unit 135 creates sharing information indicating the user with which the related cluster is to be shared as the meta information of the related cluster. The sharing unit 135 may be configured so that it is given permission of the user of the related cluster in advance, that is, before creating sharing information. The sharing unit 135 may also enable the reference cluster to be shared with the user of the related cluster.

Figure 15:
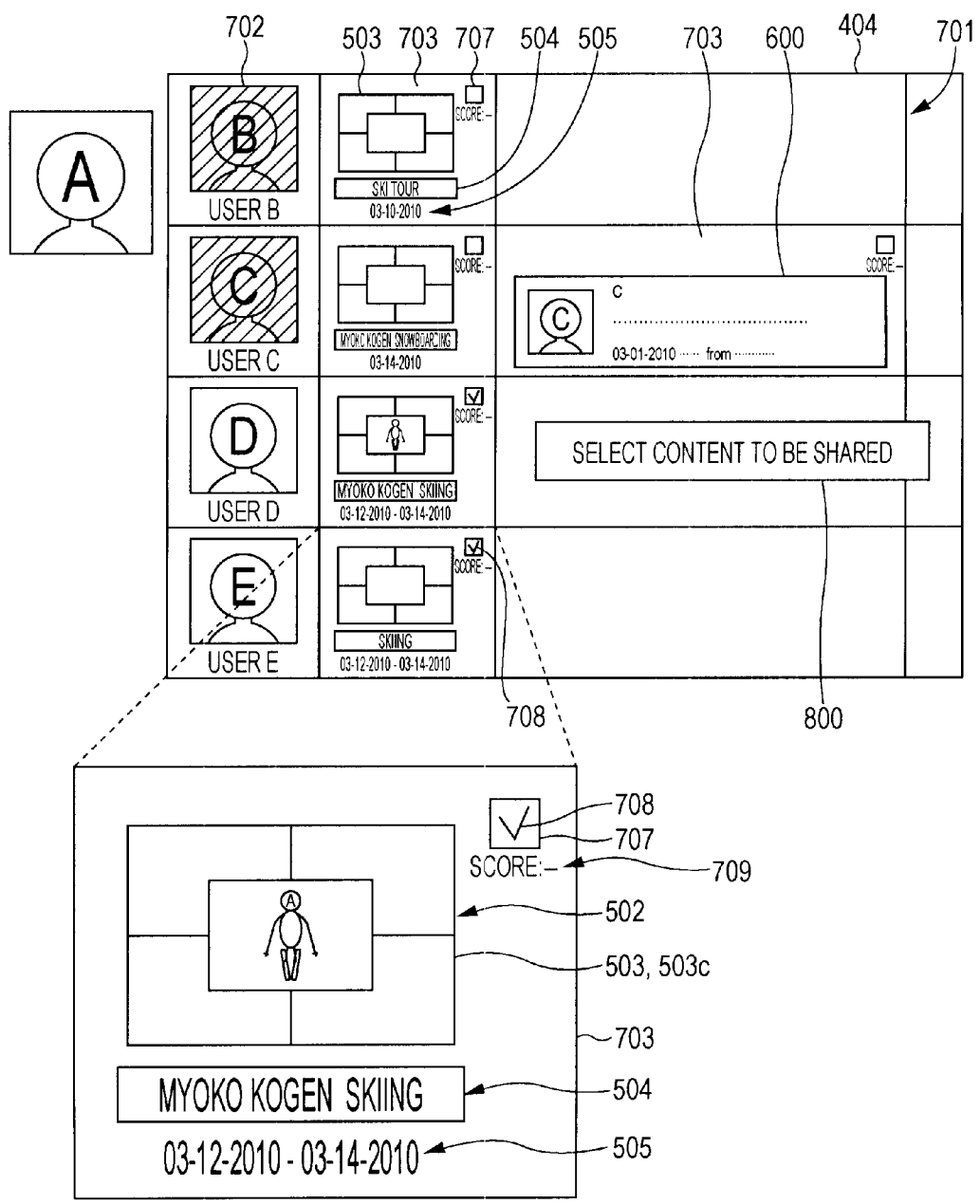
FIG. 15 is another example of an image displayed on the user terminal.

FIG. 15 shows a variation of the related cluster list image. In this variation, the evaluation value (score) of each related cluster is displayed in an evaluation value display area 709. Each user not grouped with user A is hatched. The variation enables user A to easily select related clusters closely related to user A.

As described above, in this embodiment, the information processing system 1 searches for related content related to the reference content from compared content stored in the storage server 20 and enables the related content to be shared with a plurality of users. Therefore, the information processing system 1 can automatically search for content to be shared.

The information processing system 1 sets the name of the reference content, that is, meta information, according to the related content, so the information processing system 1 can appropriately set meta tag information with ease. Particularly, when the related content has a wider variety of meta information items than the reference content, the information processing system 1 can set the meta tag information from the wider variety of meta information items, so the information processing system 1 can set more appropriate meta tag information in the related content.

The information processing system 1 can search for related content according to the reference meta information included in the reference content and the compared meta information included in the compared content, so the information processing system 1 can search for the related content with ease.

The information processing system 1 searches for related content according to at least one of the time elapsed from the reference cluster creation time to the related content creation time and the distance from the reference content creation position to the compared content creation position. Therefore, the information processing system 1 can search for compared content closely related to the reference content as the related content.

The information processing system 1 searches for compared content, as the related content, for which the time elapsed from the reference content creation time to the compared content creation time falls within a prescribed range. Therefore, the information processing system 1 can search for compared content closely related to the reference content as the related content.

The information processing system 1 searches for compared content, as the related content, for which the time elapsed from the reference content creation time to the compared content creation time is a prescribed value. Therefore, the information processing system 1 can search for compared content closely related to the reference content as the related content.

The information processing system 1 determines the prescribed value according to the reference content. Therefore, the information processing system 1 can reliably search for compared content closely related to the reference content.

The information processing system 1 searches for compared content, as the related content, for which the distance from the reference content creation position to the compared content creation position falls within a prescribed range. Therefore, the information processing system 1 can search for compared content closely related to the reference content as the related content.

The information processing system 1 searches for related content according to the total of the time evaluation value and the distance evaluation value. Therefore, the information processing system 1 can search for compared content closely related to the reference content as the related content.

The information processing system 1 searches for related content according to person information included in the compared content. Therefore, the information processing system 1 can search for compared content closely related to the reference content as the related content.

The information processing system 1 searches for compared content indicating the user of the reference content as the related content. Therefore, the information processing system 1 can search for compared content closely related to the reference content as the related content.

The information processing system 1 searches for compared content as the related content, the compared content having been created by a communication unit that has performed near field communication with a communication unit that has created the reference content. Therefore, the information processing system 1 can search for compared content closely related to the reference content as the related content.

The information processing system 1 searches for reference content according to a relationship between users. Therefore, the information processing system 1 can search for compared content closely related to the reference content as related content.

When users have formed a group, the information processing system 1 performs processing to enable related content to be shared by a plurality of users. When users are closely related to one another, therefore, the information processing system 1 enables related content to be shared.

So far, a preferred embodiment of the present disclosure has been described with reference to the attached drawings. However, the technical scope in the present disclosure is not limited to the examples described in the embodiment. It is clear that those having ordinary knowledge in the technical field in the present disclosure can devise various modified examples and corrected examples within the technical concept described in the range described in the claims. It will be understood that these examples are also included in the technical scope in the present disclosure.

The following structures are also included in the technical scope in the present disclosure.

(1)

An information processing apparatus including:

a content search unit that searches for related content from compared content, the related content being content related to reference content possessed by a first user, the compared content being content possessed by a second user; and a sharing unit that performs processing so that the related content is shared between the first user and the second user.

(2)

In the information processing apparatus described in (1) above, the content search unit searches for the related content according to reference meta information included in the reference content and to compared meta information included in the compared content.

(3)

In the information processing apparatus described in (2) above, the reference meta information includes at least one of a reference content creation time, which is a time at which the reference content was created, and a reference content creation position, at which the reference content was created;

the compared meta information includes at least one of a compared content creation time, which is a time at which the compared content was created, and a compared content creation position, at which the compared content was created;

the content search unit searches for the related content according to at least one of a time elapsed from the reference content creation time to the compared content creation time and a distance from the reference content creation position to the compared content creation position.

(4)

In the information processing apparatus described in (3) above, the content search unit searches for the compared content, as the related content, for which the time elapsed from the reference content creation time to the compared content creation time falls within a prescribed range.

(5)

In the information processing apparatus described in (3) above, the content search unit searches for the compared content, as the related content, for which the time elapsed from the reference content creation time to the compared content creation time is a prescribed value.

(6)

In the information processing apparatus described in (5) above, the content search unit determines the prescribed value according to the reference content.

(7)

In the information processing apparatus described in any one of (3) to (6) above, the content search unit searches for the compared content, as the related content, for which the distance from the reference content creation position to the compared content creation position falls within a prescribed range.

(8)

In the information processing apparatus described in any one of (3) to (7) above, the content search unit searches for the related content according to the total of a time evaluation value, which indicates the time elapsed from the reference content creation time to the compared content creation time, and a distance evaluation value, which indicates the distance from the reference content creation position to the compared content creation position.

(9)

In the information processing apparatus described in any one of (1) to (8) above, the content search unit searches for the related content according to person information included in the compared content.

(10)

In the information processing apparatus described in (9) above, the content search unit searches for the compared content including person information indicating the first user as the related content.

(11)

In the information processing apparatus described in any one of (1) to (10) above, the content search unit searches for the compared content as the related content, the compared content having been created by a communication unit that has performed near field communication with a communication unit that has created the reference content.

(12)

In the information processing apparatus described in any one of (1) to (11) above, the content search unit searches for the reference content from the compared content according to a relationship between the first user and the second user.

(13)

In the information processing apparatus described in any one of (1) to (12) above, when the second user forms a group with the first user, the sharing unit enables the related content to be shared between the first user and the second user.

(14)

An information processing method including:

searching for related content from compared content, the related content being content related to reference content possessed by a first user, the compared content being content possessed by a second user; and performing processing so that the related content is shared between the first user and the second user.

(15)

A program causing a computer to implement:

a content search function that searches for related content from compared content, the related content being content related to reference content possessed by a first user, the compared content being content possessed by a second user; and a sharing function that performs processing so that the related content is shared between the first user and the second user.

(16)

An information processing system including:

a server that has a content search unit that searches for related content from compared content, the related content being content related to reference content possessed by a first user, the compared content being content possessed by a second user, a sharing unit that performs processing so that the related content is shared between the first user and the second user, and a communication unit that sends the related content;

a first user terminal that can show the related content sent from the server to the first user; and a second user terminal that can show the related content sent from the server to the second user.

(17)

An information processing apparatus including:

a content search unit that searches for related content from compared content, the related content being content related to reference content possessed by a user, the compared content being content other than the reference content; and a meta tag assignment unit that sets meta tag information, which is a name of the reference content, according to the related content.

(18)

In the information processing apparatus described in (17) above, the content search unit searches for the related content according to reference meta information included in the reference content and to compared meta information included in the compared content.

(19)

In the information processing apparatus described in (18) above, the reference meta information includes at least one of a reference content creation time, which is a time at which the reference content was created, and a reference content creation position, at which the reference content was created;

the compared meta information includes at least one of a compared content creation time, which is a time at which the compared content was created, and a compared content creation position, at which the compared content was created;

the content search unit searches for the related content according to at least one of the time elapsed from the reference content creation time to the compared content creation time and the distance from the reference content creation position to the compared content creation position.

(20)

In the information processing apparatus described in (19) above, the content search unit searches for the compared content, as the related content, for which the time elapsed from the reference content creation time to the compared content creation time falls within a prescribed range.

(21)

In the information processing apparatus described in (19) above, the content search unit searches for the compared content, as the related content, for which the time elapsed from the reference content creation time to the compared content creation time is a prescribed value.

(22)

In the information processing apparatus described in (21) above, the content search unit determines the prescribed value according to the reference content.

(23)

In the information processing apparatus described in any one of (19) to (22) above, the content search unit searches for the compared content, as the related content, for which the distance from the reference content creation position to the compared content creation position falls within a prescribed range.

(24)

In the information processing apparatus described in any one of (19) to (23) above, the content search unit searches for the related content according to the total of a time evaluation value, which indicates the time elapsed from the reference content creation time to the compared content creation time, and a distance evaluation value, which indicates the distance from the reference content creation position to the compared content creation position.

(25)

In the information processing apparatus described in any one of (17) to (24) above, the content search unit searches for the related content according to person information included in the compared content.

(26)

In the information processing apparatus described in (25) above, the content search unit searches for the compared content including person information indicating the user as the related content.

(27)

In the information processing apparatus described in any one of (17) to (26) above, the content search unit searches for the compared content as the related content, the compared content having been created by a communication unit that has performed near field communication with a communication unit that has created the reference content.

(28)

An information processing method including:

searching for related content from compared content, the related content being content related to reference content possessed by a user, the compared content being content other than the reference content; and setting meta tag information, which is a name of the reference content, according to the related content.

(29)

A program causing a computer to implement:

a content search function that searches for related content from compared content, the related content being content related to reference content possessed by a user, the compared content being content other than the reference content; and a meta tag assignment function that sets meta tag information, which is a name of the reference content, according to the related content.

(30)

An information processing system including:

a server that has a content search unit that searches for related content from compared content, the related content being content related to reference content possessed by a user, the compared content being content other than the reference content, and a meta tag assignment unit that sets meta tag information, which is a name of the reference content, according to the related content; and a user terminal that asks the server to assign meta tag information to the reference content.

(31)

The information processing system described in (30) above, the content search unit acquires meta information from the reference content, creates list information of the meta information, and sends the list information of the meta information to the user terminal;

the user terminal shows the list information of the meta information.

(32)

The information processing system described in (31) above, the content search unit calculates an evaluation value indicating a degree of a relationship between the related content and the reference content and sorts meta information in the list information of the meta information according to the evaluation value.

The present disclosure contains subject matter related to that disclosed in Japanese Priority Patent Application JP 2011-172749 filed in the Japan Patent Office on Aug. 8, 2011 and Japanese Priority Patent Application JP 2011-172748 filed in the Japan Patent on Office Aug. 8, 2011, the entire contents of which are hereby incorporated by reference.

What is claimed is:

1. An information processing apparatus, comprising:
a memory; and
circuitry configured to:
 search for related content from compared content stored in the memory, the related content being content related to reference content possessed by a user, the compared content being content other than the reference content, wherein the related content is a cluster comprising a plurality of first content items, wherein the compared content includes a plurality of clusters such that each of the plurality of clusters comprises a plurality of second content items, and wherein the reference content is a cluster comprising a plurality of content items possessed by the user,
 set, in response to a selection to perform meta tag assignment processing, meta tag information according to the related content, wherein the meta tag information is a name of the reference content,
 determine, in response to a selection to perform sharing processing, whether the related content is shareable between the user who is associated with the related content and another user, based on whether a relationship exists between the user and the another user, and
 display a list of users with whom the related content is not shareable and of users with whom the related content is shareable, the users with whom the related content is not shareable being displayed in a distinguishing fashion from the users with whom the related content is shareable,
 wherein the circuitry is configured to search for the related content according to reference meta information included in the reference content, and according to compared meta information included in the compared content, wherein the reference meta information include at least one of a reference content creation time, which is a time at which the reference content was created, and a reference content creation position, at which the reference content was created, and wherein the compared meta information includes at least one of a compared content creation time, which is a time at which the compared content was created, and a compared content creation position, at which the compared content was created, wherein the reference meta information of the reference content includes a plurality of reference content creation times associated with the plurality of the content items possessed by the user, wherein each of the plurality of reference content creation times represents a creation time of the corresponding content item of the reference content possessed by the user, and wherein the search for the related content is based on at least one of a time elapsed from the reference content creation time to the compared content creation time and a distance from the reference content creation position to the compared content creation position.

2. The information processing apparatus according to claim 1, wherein the circuitry is configured to search for the compared content, as the related content, for which the time elapsed from the reference content creation time to the compared content creation time falls within a prescribed range.

3. The information processing apparatus according to claim 1, wherein the circuitry is configured to search for the compared content, as the related content, for which the time elapsed from the reference content creation time to the compared content creation time is a prescribed value.

4. The information processing apparatus according to claim 3, wherein the circuitry is configured to determine the prescribed value according to the reference content.

5. The information processing apparatus according to claim 1, wherein the circuitry is configured to search for the compared content, as the related content, for which the distance from the reference content creation position to the compared content creation position falls within a prescribed range.

6. The information processing apparatus according to claim 1, wherein the circuitry is configured to search for the related content according to a total of a time evaluation value, which indicates the time elapsed from the reference content creation time to the compared content creation time, and a distance evaluation value, which indicates the distance from the reference content creation position to the compared content creation position.

7. The information processing apparatus according to claim 1, wherein the circuitry is configured to search for the related content according to person information included in the compared content.

8. The information processing apparatus according to claim 7, wherein the circuitry is configured to search for the compared content including the person information indicating the user as the related content.

9. The information processing apparatus according to claim 1, wherein the circuitry is configured to search for the compared content, as the related content, the compared content having been created by a communication device that has performed near field communication with a communication unit that has created the reference content.

10. An information processing method, comprising:
searching for related content from compared content, the related content being content related to reference content possessed by a user, the compared content being content other than the reference content, wherein the related content is a cluster comprising a plurality of first content items, wherein the compared content includes a plurality of clusters such that each of the plurality of clusters comprises a plurality of second content items, and wherein the reference content is a cluster comprising a plurality of content items possessed by the user;
setting, in response to a selection to perform meta tag assignment processing, meta tag information according to the related content, wherein the meta tag information is a name of the reference content;
determining, in response to a selection to perform sharing processing, whether the related content is shareable between the user who is associated with the related content and another user, based on whether a relationship exists between the user and the another user; and
displaying a list of users with whom the related content is not shareable and of users with whom the related content is shareable, the users with whom the related content is not shareable being displayed in a distinguishing fashion from the users with whom the related content is shareable,
wherein the related content is searched according to reference meta information included in the reference content and according to compared meta information included in the compared content, wherein the reference meta information include at least one of a reference content creation time, which is a time at which the reference content was created, and a reference content creation position, at which the reference content was created, and wherein the compared meta information includes at least one of a compared content creation time, which is a time at which the compared content was created, and a compared content creation position, at which the compared content was created,
wherein the reference meta information of the reference content includes a plurality of reference content creation times associated with the plurality of the content items possessed by the user, wherein each of the plurality of reference content creation times represents a creation time of the corresponding content item of the reference content possessed by the user, and
wherein the search for the related content is based on at least one of a time elapsed from the reference content creation time to the compared content creation time and a distance from the reference content creation position to the compared content creation position.

11. A non-transitory computer-readable storage medium including computer executable instructions, wherein the instructions, when executed by a computer, cause the computer to perform a method, the method comprising:
searching for related content from compared content stored in a memory of an information processing apparatus, the related content being content related to reference content possessed by a user, the compared content being content other than the reference content, wherein the related content is a cluster comprising a plurality of first content items, wherein the compared content includes a plurality of clusters such that each of the plurality of clusters comprises a plurality of second content items, and wherein the reference content is a cluster comprising a plurality of content items possessed by the user;

setting, in response to a selection to perform meta tag assignment processing, meta tag information according to the related content, wherein the meta tag information is a name of the reference content;

determining, in response to a selection to perform sharing processing, whether the related content is shareable between the user who is associated with the related content and another user, based on whether a relationship exists between the user and the another user; and displaying a list of users with whom the related content is not shareable and of users with whom the related content is shareable, the users with whom the related content is not shareable being displayed in a distinguishing fashion from the users with whom the related content is shareable, wherein the related content is searched according to reference meta information included in the reference content and according to compared meta information included in the compared content, wherein the reference meta information include at least one of a reference content creation time, which is a time at which the reference content was created, and a reference content creation position, at which the reference content was created, and wherein the compared meta information includes at least one of a compared content creation time, which is a time at which the compared content was created, and a compared content creation position, at which the compared content was created, wherein the reference meta information of the reference content includes a plurality of reference content creation times associated with the plurality of the content items possessed by the user, wherein each of the plurality of reference content creation times represents a creation time of the corresponding content item of the reference content possessed by the user, and wherein the search for the related content is based on at least one of a time elapsed from the reference content creation time to the compared content creation time and a distance from the reference content creation position to the compared content creation position.

12. An information processing system, comprising:
a server that includes circuitry configured to:
search for related content from compared content, the related content being content related to reference content possessed by a user, the compared content being content other than the reference content, wherein the related content is a cluster comprising a plurality of first content items, wherein the compared content includes a plurality of clusters such that each of the plurality of clusters comprises a plurality of second content items, and wherein the reference content is a cluster comprising a plurality of content items possessed by the user, set, in response to a selection to perform meta tag assignment processing, meta tag information according to the related content, wherein the meta tag information is a name of the reference content, determine, in response to a selection to perform sharing processing, whether the related content is shareable between the user who is associated with the related content and another user, based on whether a relationship exists between the user and the another user, and display a list of users with whom the related content is not shareable and of users with whom the related content is shareable, the users with whom the related content is not shareable being displayed in a distinguishing fashion from the users with whom the related content is shareable, wherein the circuitry is configured to search for the related content according to reference meta information included in the reference content and according to compared meta information included in the compared content, wherein the reference meta information include at least one of a reference content creation time, which is a time at which the reference content was created, and a reference content creation position, at which the reference content was created, and wherein the compared meta information includes at least one of a compared content creation time, which is a time at which the compared content was created, and a compared content creation position, at which the compared content was created, wherein the reference meta information of the reference content includes a plurality of reference content creation times associated with the plurality of the content items possessed by the user, wherein each of the plurality of reference content creation times represents a creation time of the corresponding content item of the reference content possessed by the user, and wherein the search for the related content is based on at least one of a time elapsed from the reference content creation time to the compared content creation time and a distance from the reference content creation position to the compared content creation position; and a user terminal configured to request the server to assign the meta tag information to the reference content.

13. The information processing system according to claim 12, wherein:
the circuitry is configured to acquire meta information from the reference content, create list information of the acquired meta information, and send the list information of the acquired meta information to the user terminal; and
the user terminal shows the list information of the acquired meta information.

14. The information processing system according to claim 13, wherein the circuitry is configured to calculate an evaluation value indicating a degree of a relationship between the related content and the reference content and sort the meta information in the list information of the acquired meta information according to the evaluation value.

15. The information processing apparatus according to claim 1,
wherein the circuitry is configured to search for the related content according to compared meta information included in the compared content, and
wherein the compared meta information of the compared content includes a plurality of compared content creation times associated with the plurality of the second content items, wherein each of the plurality of compared content creation times represents a creation time of the corresponding second content item of the compared content.

16. The information processing apparatus according to claim 15, wherein the reference content creation time of the reference content is an average of the plurality of reference content creation times and the compared content creation time is an average of the plurality of compared content creation times.

17. The information processing apparatus according to claim 1,
- wherein the reference meta information of the reference content includes a plurality of reference content creation positions associated with the plurality of the content items possessed by the user, wherein each of the plurality of reference content creation positions represents a creation position of the corresponding content item of the reference content possessed by the user,
- wherein the circuitry is configured to search for the related content according to compared meta information included in the compared content, and
- wherein the compared meta information of the compared content includes a plurality of compared content creation positions associated with the plurality of the second content items, wherein each of the plurality of compared content creation positions represents a creation position of the corresponding second content item.

18. The information processing apparatus according to claim 17, wherein the reference content creation position of the reference content is an average of the plurality of reference content creation positions and the compared content creation position is an average of the plurality of compared content creation positions.

* * * * *